(12) United States Patent
Hodge

(10) Patent No.: US 9,930,088 B1
(45) Date of Patent: Mar. 27, 2018

(54) UTILIZING VOIP CODEC NEGOTIATION DURING A CONTROLLED ENVIRONMENT CALL

(71) Applicant: **Global Tel*Link Corporation**, Reston, VA (US)

(72) Inventor: Stephen Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 15/630,759

(22) Filed: Jun. 22, 2017

(51) Int. Cl.
*H04L 29/06* (2006.01)
*H04M 7/00* (2006.01)
*H04M 3/22* (2006.01)

(52) U.S. Cl.
CPC .......... *H04L 65/605* (2013.01); *H04L 65/105* (2013.01); *H04L 65/1006* (2013.01); *H04L 65/1069* (2013.01); *H04L 65/4015* (2013.01); *H04L 65/608* (2013.01); *H04M 3/2281* (2013.01); *H04M 7/0078* (2013.01); *H04M 7/0072* (2013.01); *H04M 2201/41* (2013.01); *H04M 2203/6027* (2013.01); *H04M 2203/6054* (2013.01)

(58) Field of Classification Search
CPC .................................................. H04L 65/605
See application file for complete search history.

(56) References Cited

U.S. PATENT DOCUMENTS 3,406,344 A 10/1968 Hopper
3,801,747 A 4/1974 Queffeulou et al.
3,985,956 A 10/1976 Monti et al.
4,028,496 A 6/1977 LaMarche et al.
(Continued)

FOREIGN PATENT DOCUMENTS

EP 1280137 B1 12/2004
GB 2075313 A 11/1981
(Continued)

OTHER PUBLICATIONS

"Audio/Video Transport (avt)," Internet Archive Wayback Machine, Oct. 16, 2002, retrieved from http://web.archive.org/web/20021016171815/http://www.ietf.org:80/html.charters/avt-charter.html.
(Continued)

*Primary Examiner* — Andrew Lai
*Assistant Examiner* — Andrew C Lee
(74) *Attorney, Agent, or Firm* — Sterne, Kessler, Goldstein & Fox P.L.L.C.

(57) ABSTRACT

Controlled-environment communication systems are increasingly using voice over internet protocol (VoIP) to serve their users. VoIP allows voice to be sent in packetized form, where audio is encoded using one of several codecs. Because of bandwidth constraints, particularly during peak call times, codecs may be used which sacrifice audio quality for bandwidth efficiency. As a result, several features of communication systems, including critical security features. The present disclosure provides details for systems and methods by which a controlled-environment communication system may shift between codecs to perform security-related features or to alleviate bandwidth considerations. This involves the special formatting of control-signaling messages, including session initiation protocol (SIP) and session description protocol (SDP) messaging.

30 Claims, 12 Drawing Sheets

(56) References Cited

U.S. PATENT DOCUMENTS

| | | |
|---|---|---|
| 4,054,756 A | 10/1977 | Comella et al. |
| 4,191,860 A | 3/1980 | Weber |
| 4,670,628 A | 6/1987 | Boratgis et al. |
| 4,691,347 A | 9/1987 | Stanley et al. |
| 4,703,476 A | 10/1987 | Howard |
| 4,737,982 A | 4/1988 | Boratgis et al. |
| 4,813,070 A | 3/1989 | Humphreys et al. |
| 4,907,221 A | 3/1990 | Pariani et al. |
| 4,918,719 A | 4/1990 | Daudelin |
| 4,935,956 A | 6/1990 | Hellwarth et al. |
| 4,943,973 A | 7/1990 | Werner |
| 4,995,030 A | 2/1991 | Helf |
| 5,229,764 A | 7/1993 | Matchett et al. |
| 5,291,548 A | 3/1994 | Tsumura et al. |
| 5,319,702 A | 6/1994 | Kitchin et al. |
| 5,319,735 A | 6/1994 | Preuss et al. |
| 5,345,595 A | 9/1994 | Johnson et al. |
| 5,379,345 A | 1/1995 | Greenberg |
| 5,425,091 A | 6/1995 | Josephs |
| 5,438,616 A | 8/1995 | Peoples |
| 5,483,593 A | 1/1996 | Gupta et al. |
| 5,502,762 A | 3/1996 | Andrew et al. |
| 5,535,194 A | 7/1996 | Ashley et al. |
| 5,535,261 A | 7/1996 | Brown et al. |
| 5,539,731 A | 7/1996 | Haneda et al. |
| 5,539,812 A | 7/1996 | Kitchin et al. |
| 5,555,551 A | 9/1996 | Rudokas et al. |
| 5,583,925 A | 12/1996 | Bernstein |
| 5,590,171 A | 12/1996 | Howe |
| 5,592,548 A | 1/1997 | Sih |
| 5,613,004 A | 3/1997 | Cooperman |
| 5,619,561 A | 4/1997 | Reese |
| 5,623,539 A | 4/1997 | Bassenyemukasa et al. |
| 5,634,086 A | 5/1997 | Rtischev et al. |
| 5,636,292 A | 6/1997 | Rhoads |
| 5,640,490 A | 6/1997 | Hansen et al. |
| 5,646,940 A | 7/1997 | Hotto |
| 5,649,060 A | 7/1997 | Ellozy et al. |
| 5,655,013 A | 8/1997 | Gainsboro |
| 5,675,704 A | 10/1997 | Juang et al. |
| 5,687,236 A | 11/1997 | Moskowitz |
| 5,710,834 A | 1/1998 | Rhoads |
| 5,719,937 A | 2/1998 | Warren et al. |
| 5,745,558 A | 4/1998 | Richardson, Jr. et al. |
| 5,745,569 A | 4/1998 | Moskowitz |
| 5,745,604 A | 4/1998 | Rhoads |
| 5,748,726 A | 5/1998 | Unno |
| 5,748,763 A | 5/1998 | Rhoads |
| 5,748,783 A | 5/1998 | Rhoads |
| 5,757,889 A | 5/1998 | Ohtake |
| 5,768,355 A | 6/1998 | Salibrici et al. |
| 5,768,426 A | 6/1998 | Rhoads |
| 5,774,452 A | 6/1998 | Wolosewicz |
| 5,796,811 A | 8/1998 | McFarlen |
| 5,802,145 A | 9/1998 | Farris et al. |
| 5,805,685 A | 9/1998 | McFarlen |
| 5,809,462 A | 9/1998 | Nussbaum |
| 5,822,432 A | 10/1998 | Moskowitz et al. |
| 5,822,436 A | 10/1998 | Rhoads |
| 5,822,726 A | 10/1998 | Taylor et al. |
| 5,832,119 A | 11/1998 | Rhoads |
| 5,835,486 A | 11/1998 | Davis et al. |
| 5,841,886 A | 11/1998 | Rhoads |
| 5,841,978 A | 11/1998 | Rhoads |
| 5,850,481 A | 12/1998 | Rhoads |
| 5,862,260 A | 1/1999 | Rhoads |
| 5,867,562 A | 2/1999 | Scherer |
| 5,883,945 A | 3/1999 | Richardson, Jr. et al. |
| 5,889,568 A | 3/1999 | Seraphim et al. |
| 5,889,868 A | 3/1999 | Moskowitz et al. |
| 5,899,972 A | 5/1999 | Miyazawa et al. |
| 5,907,602 A | 5/1999 | Peel et al. |
| 5,920,834 A | 7/1999 | Sih et al. |
| 5,926,533 A | 7/1999 | Gainsboro |
| 5,930,369 A | 7/1999 | Cox et al. |
| 5,930,377 A | 7/1999 | Powell et al. |
| 5,953,049 A | 9/1999 | Horn et al. |
| 5,960,080 A | 9/1999 | Fahlman et al. |
| 5,963,909 A | 10/1999 | Warren et al. |
| 5,982,891 A | 11/1999 | Ginter et al. |
| 5,999,828 A | 12/1999 | Sih et al. |
| 6,011,849 A | 1/2000 | Orrin |
| 6,026,193 A | 2/2000 | Rhoads |
| 6,035,034 A | 3/2000 | Trump |
| 6,052,454 A | 4/2000 | Kek et al. |
| 6,052,462 A | 4/2000 | Lu |
| 6,064,963 A | 5/2000 | Gainsboro |
| 6,072,860 A | 6/2000 | Kek et al. |
| 6,078,567 A | 6/2000 | Traill et al. |
| 6,078,645 A | 6/2000 | Cai et al. |
| 6,078,807 A | 6/2000 | Dunn et al. |
| 6,111,954 A | 8/2000 | Rhoads |
| 6,122,392 A | 9/2000 | Rhoads |
| 6,122,403 A | 9/2000 | Rhoads |
| 6,138,119 A | 10/2000 | Hall et al. |
| 6,140,956 A | 10/2000 | Hillman et al. |
| 6,141,406 A | 10/2000 | Johnson |
| 6,141,415 A | 10/2000 | Rao |
| 6,157,707 A | 12/2000 | Baulier et al. |
| 6,160,903 A | 12/2000 | Hamid et al. |
| 6,185,416 B1 | 2/2001 | Rudokas et al. |
| 6,185,683 B1 | 2/2001 | Ginter et al. |
| 6,205,249 B1 | 3/2001 | Moskowitz |
| 6,219,640 B1 | 4/2001 | Basu et al. |
| 6,233,347 B1 | 5/2001 | Chen et al. |
| 6,237,786 B1 | 5/2001 | Ginter et al. |
| 6,243,480 B1 | 6/2001 | Zhao et al. |
| 6,243,676 B1 | 6/2001 | Witteman |
| 6,253,193 B1 | 6/2001 | Ginter et al. |
| 6,263,507 B1 | 7/2001 | Ahmad et al. |
| 6,266,430 B1 | 7/2001 | Rhoads |
| 6,278,772 B1 | 8/2001 | Bowater et al. |
| 6,278,781 B1 | 8/2001 | Rhoads |
| 6,289,108 B1 | 9/2001 | Rhoads |
| 6,298,122 B1 | 10/2001 | Horne |
| 6,301,360 B1 | 10/2001 | Bocionek et al. |
| 6,312,911 B1 | 11/2001 | Bancroft |
| 6,314,192 B1 | 11/2001 | Chen et al. |
| 6,324,573 B1 | 11/2001 | Rhoads |
| 6,324,650 B1 | 11/2001 | Ogilvie |
| 6,327,352 B1 | 12/2001 | Betts et al. |
| 6,330,335 B1 | 12/2001 | Rhoads |
| 6,343,138 B1 | 1/2002 | Rhoads |
| 6,343,738 B1 | 2/2002 | Ogilvie |
| 6,345,252 B1 | 2/2002 | Beigi et al. |
| 6,385,548 B2 | 5/2002 | Ananthaiyer et al. |
| 6,389,293 B1 | 5/2002 | Clore et al. |
| 6,421,645 B1 | 7/2002 | Beigi et al. |
| 6,526,380 B1 | 2/2003 | Thelen et al. |
| 6,542,602 B1 | 4/2003 | Elazar |
| 6,549,587 B1 | 4/2003 | Li |
| 6,584,138 B1 | 6/2003 | Neubauer et al. |
| 6,614,781 B1 * | 9/2003 | Elliott ................. H04L 12/6418 370/352 |
| 6,625,587 B1 | 9/2003 | Erten et al. |
| 6,633,846 B1 | 10/2003 | Bennett et al. |
| 6,647,096 B1 | 11/2003 | Milliorn et al. |
| 6,665,376 B1 | 12/2003 | Brown |
| 6,665,644 B1 | 12/2003 | Kanevsky et al. |
| 6,671,292 B1 | 12/2003 | Haartsen |
| 6,728,682 B2 | 4/2004 | Fasciano |
| 6,748,356 B1 | 6/2004 | Beigi et al. |
| 6,760,697 B1 | 7/2004 | Neumeyer et al. |
| 6,763,099 B1 | 7/2004 | Blink |
| 6,788,772 B2 | 9/2004 | Barak et al. |
| 6,792,030 B2 | 9/2004 | Lee et al. |
| 6,810,480 B1 | 10/2004 | Parker et al. |
| 6,873,617 B1 | 3/2005 | Karras |
| 6,880,171 B1 | 4/2005 | Ahmad et al. |
| 6,895,086 B2 | 5/2005 | Martin |
| 6,898,612 B1 | 5/2005 | Parra et al. |
| 6,907,387 B1 | 6/2005 | Reardon |
| 7,035,386 B1 | 4/2006 | Susen et al. |
| 7,039,585 B2 | 5/2006 | Wilmot et al. |

(56) References Cited

U.S. PATENT DOCUMENTS

| | | | |
|---|---|---|---|
| 7,050,918 B2 | 5/2006 | Pupalaikis et al. | |
| 7,079,636 B1 | 7/2006 | McNitt et al. | |
| 7,079,637 B1 | 7/2006 | McNitt et al. | |
| 7,103,549 B2 | 9/2006 | Bennett et al. | |
| 7,106,843 B1 | 9/2006 | Gainsboro et al. | |
| 7,123,704 B2 | 10/2006 | Martin | |
| 7,133,828 B2 | 11/2006 | Scarano et al. | |
| 7,149,788 B1 | 12/2006 | Gundla et al. | |
| 7,197,560 B2 | 3/2007 | Caslin et al. | |
| 7,248,685 B2 | 7/2007 | Martin | |
| 7,256,816 B2 | 8/2007 | Profanchik et al. | |
| 7,277,468 B2 | 10/2007 | Tian et al. | |
| 7,333,798 B2 | 2/2008 | Hodge | |
| 7,417,983 B2 | 8/2008 | He et al. | |
| 7,426,265 B2 | 9/2008 | Chen et al. | |
| 7,494,061 B2 | 2/2009 | Reinhold | |
| 7,505,406 B1 | 3/2009 | Spadaro et al. | |
| 7,519,169 B1 | 4/2009 | Hingoranee et al. | |
| 7,522,728 B1 | 4/2009 | Rhoads | |
| 7,529,357 B1 | 5/2009 | Rae et al. | |
| 7,596,498 B2 | 9/2009 | Basu et al. | |
| 7,639,791 B2 | 12/2009 | Hodge | |
| 7,664,243 B2 | 2/2010 | Martin | |
| 7,765,302 B2 | 7/2010 | Whynot et al. | |
| 7,826,604 B2 | 11/2010 | Martin | |
| 7,848,510 B2 | 12/2010 | Shaffer et al. | |
| 7,853,243 B2 | 12/2010 | Hodge | |
| 7,860,114 B1* | 12/2010 | Gallant | H04L 29/06 370/401 |
| 7,899,167 B1 | 3/2011 | Rae | |
| 7,916,845 B2 | 3/2011 | Rae et al. | |
| 7,961,858 B2 | 6/2011 | Polozola et al. | |
| 7,961,860 B1 | 6/2011 | McFarlen | |
| 8,000,269 B1 | 8/2011 | Rae | |
| 8,031,849 B1 | 10/2011 | Apple et al. | |
| 8,054,960 B1 | 11/2011 | Gunasekara | |
| 8,059,656 B1* | 11/2011 | Telikepalli | H04L 65/1069 370/395.2 |
| 8,059,790 B1* | 11/2011 | Paterik | G06F 17/27 370/352 |
| 8,090,082 B2 | 1/2012 | Gilbert | |
| 8,130,662 B1* | 3/2012 | Goode | H04M 7/0072 370/252 |
| 8,345,850 B2 | 1/2013 | Hodge | |
| 8,351,581 B2 | 1/2013 | Mikan | |
| 8,396,200 B2 | 3/2013 | Hodge et al. | |
| 8,542,802 B2 | 9/2013 | Olligschlaeger | |
| 8,630,726 B2 | 1/2014 | Hodge | |
| 8,731,934 B2 | 5/2014 | Olligschlaeger et al. | |
| 8,869,275 B2 | 10/2014 | Zhao et al. | |
| 8,886,663 B2 | 11/2014 | Gainsboro et al. | |
| 8,929,525 B1 | 1/2015 | Edwards | |
| 8,942,356 B2 | 1/2015 | Olligschlaeger | |
| 8,953,583 B2 | 2/2015 | Swaminathan et al. | |
| 8,953,758 B2 | 2/2015 | Kumar | |
| 9,031,057 B2 | 5/2015 | Long et al. | |
| 9,143,610 B2 | 9/2015 | Hodge | |
| 9,225,838 B2 | 12/2015 | Hodge et al. | |
| 9,253,439 B2 | 2/2016 | Andrada et al. | |
| 9,614,974 B1* | 4/2017 | Hodge | H04M 7/0078 |
| 9,621,732 B2 | 4/2017 | Olligschlaeger | |
| 9,667,667 B2* | 5/2017 | Silver | H04L 65/1076 |
| 2001/0056349 A1 | 12/2001 | St. John | |
| 2001/0056461 A1 | 12/2001 | Kampe et al. | |
| 2002/0002464 A1 | 1/2002 | Pertrushin | |
| 2002/0010587 A1 | 1/2002 | Pertrushin | |
| 2002/0032566 A1 | 3/2002 | Tzirkel-Hancock et al. | |
| 2002/0184373 A1* | 12/2002 | Maes | G06F 9/445 709/227 |
| 2003/0023444 A1 | 1/2003 | St. John | |
| 2003/0040326 A1 | 2/2003 | Levy et al. | |
| 2003/0063578 A1 | 4/2003 | Weaver | |
| 2003/0076815 A1* | 4/2003 | Miller | H04L 49/602 370/352 |
| 2003/0086541 A1 | 5/2003 | Brown et al. | |
| 2003/0086546 A1 | 5/2003 | Falcone et al. | |
| 2003/0088421 A1* | 5/2003 | Maes | G10L 15/30 704/270.1 |
| 2004/0029564 A1 | 2/2004 | Hodge | |
| 2004/0047437 A1* | 3/2004 | Hamiti | H04W 28/18 375/326 |
| 2004/0162726 A1* | 8/2004 | Chang | G10L 17/22 704/247 |
| 2004/0196867 A1* | 10/2004 | Ejzak | H04M 3/56 370/468 |
| 2004/0249650 A1 | 12/2004 | Freedman et al. | |
| 2004/0252184 A1 | 12/2004 | Hesse et al. | |
| 2005/0010411 A1 | 1/2005 | Rigazio et al. | |
| 2005/0014491 A1 | 1/2005 | Johnson | |
| 2005/0060411 A1* | 3/2005 | Coulombe | H04L 29/06 709/227 |
| 2005/0080625 A1 | 4/2005 | Bennett et al. | |
| 2005/0083912 A1* | 4/2005 | Afshar | H04L 29/06027 370/352 |
| 2005/0114192 A1 | 5/2005 | Tor et al. | |
| 2005/0125226 A1 | 6/2005 | Magee | |
| 2005/0128283 A1 | 6/2005 | Bulriss et al. | |
| 2005/0141694 A1* | 6/2005 | Wengrovitz | H04M 3/5191 379/265.09 |
| 2005/0144004 A1 | 6/2005 | Bennett et al. | |
| 2005/0182628 A1 | 8/2005 | Choi | |
| 2005/0207541 A1 | 9/2005 | Cote | |
| 2006/0064037 A1 | 3/2006 | Shalon et al. | |
| 2006/0087554 A1 | 4/2006 | Boyd et al. | |
| 2006/0087555 A1 | 4/2006 | Boyd et al. | |
| 2006/0094472 A1* | 5/2006 | Othmer | G10L 19/20 455/563 |
| 2006/0198504 A1 | 9/2006 | Shemisa et al. | |
| 2006/0200353 A1 | 9/2006 | Bennett | |
| 2006/0209794 A1* | 9/2006 | Bae | H04L 12/6418 370/352 |
| 2006/0285650 A1 | 12/2006 | Hodge | |
| 2006/0285665 A1 | 12/2006 | Wasserblat et al. | |
| 2007/0011235 A1 | 1/2007 | Mutikainen et al. | |
| 2007/0022289 A1* | 1/2007 | Alt | H04L 63/0272 713/168 |
| 2007/0047734 A1 | 3/2007 | Frost | |
| 2007/0071206 A1 | 3/2007 | Gainsboro et al. | |
| 2007/0185717 A1 | 8/2007 | Bennett | |
| 2007/0206568 A1* | 9/2007 | Silver | H04L 12/66 370/352 |
| 2007/0237099 A1 | 10/2007 | He et al. | |
| 2007/0242658 A1 | 10/2007 | Rae et al. | |
| 2007/0244690 A1 | 10/2007 | Peters | |
| 2007/0291776 A1* | 12/2007 | Kenrick | H04L 29/06027 370/401 |
| 2008/0000966 A1 | 1/2008 | Keiser | |
| 2008/0021708 A1 | 1/2008 | Bennett et al. | |
| 2008/0046241 A1 | 2/2008 | Osburn et al. | |
| 2008/0106370 A1 | 5/2008 | Perez et al. | |
| 2008/0118045 A1 | 5/2008 | Polozola et al. | |
| 2008/0123687 A1* | 5/2008 | Bangalore | H04L 65/104 370/467 |
| 2008/0195387 A1 | 8/2008 | Zigel et al. | |
| 2008/0198978 A1 | 8/2008 | Olligschlaeger | |
| 2008/0201143 A1 | 8/2008 | Olligschlaeger et al. | |
| 2008/0201158 A1 | 8/2008 | Johnson et al. | |
| 2008/0260133 A1 | 10/2008 | Hodge et al. | |
| 2008/0300878 A1 | 12/2008 | Bennett | |
| 2008/0319761 A1* | 12/2008 | Da Palma | G10L 15/30 704/275 |
| 2008/0320148 A1* | 12/2008 | Capuozzo | H04L 29/06027 709/227 |
| 2010/0177881 A1 | 7/2010 | Hodge | |
| 2010/0202595 A1 | 8/2010 | Hodge et al. | |
| 2011/0055256 A1 | 3/2011 | Phillips et al. | |
| 2012/0069983 A1 | 3/2012 | Sall | |
| 2013/0007293 A1 | 1/2013 | Den Hartog et al. | |
| 2013/0163590 A1* | 6/2013 | Bouvet | H04L 41/0896 370/352 |
| 2013/0223304 A1* | 8/2013 | Tanaka | H04L 65/1016 370/310 |

(56) References Cited

U.S. PATENT DOCUMENTS

| | | | | |
|---|---|---|---|---|
| 2013/0230057 | A1* | 9/2013 | Hori | H04W 28/18 |
| | | | | 370/466 |
| 2013/0294335 | A1* | 11/2013 | Suni | H04W 40/02 |
| | | | | 370/328 |
| 2013/0322614 | A1 | 12/2013 | Hodge et al. | |
| 2014/0126715 | A1* | 5/2014 | Lum | H04M 3/5133 |
| | | | | 379/265.09 |
| 2015/0078332 | A1* | 3/2015 | Sidhu | H04W 36/0066 |
| | | | | 370/331 |
| 2015/0201083 | A1 | 7/2015 | Olligschlaeger | |
| 2016/0021163 | A1* | 1/2016 | Lee | H04L 65/605 |
| | | | | 370/352 |
| 2016/0044161 | A1 | 2/2016 | Hodge et al. | |
| 2017/0006159 | A1 | 1/2017 | Olligschlaeger | |
| 2017/0222832 | A1* | 8/2017 | Silver | H04L 12/4633 |
| | | | | 370/353 |

FOREIGN PATENT DOCUMENTS

| | | |
|---|---|---|
| JP | 59225626 | 12/1984 |
| JP | 60010821 A | 1/1985 |
| JP | 61135239 A | 6/1986 |
| JP | 3065826 A | 3/1991 |
| WO | WO 96/014703 | 5/1996 |
| WO | WO 98/027768 | 6/1998 |

OTHER PUBLICATIONS

"Cisco IAD2400 Series Business-Class Integrated Access Device", Cisco Systems Datasheet, 2003.
"Internet Protocol DARPA Internet Program Protocol Specification," Defense Advanced Research Projects Agency, RFC 791, Sep. 1981; 50 pages.
"Overview of the IETF," Internet Archive Wayback Machine, Aug. 2, 2002, retrieved from http://web.archive.org/web/20020802043453/www.ietf.org/overview.html.
"SIP and IPLinkTM in the Next Generation Network: An Overview," Intel, 2001.
"Voice Over Packet in Next Generation Networks: An Architectural Framework," Bellcore, Special Report SR-4717, Issue 1, Jan. 1999.
"Cool Edit Pro, Version 1.2 User Guide," Syntrillium Software Corporation, 1998.
"Criminal Calls: A Review of the Bureau of Prisons' Management of Inmate Telephone Privileges," U.S Department of Justice, Office of the Inspector General, Aug. 1999.
"Global Call API for Linux and Windows Operating Systems," Intel Dialogic Library Reference, Dec. 2005.
"The NIST Year 2002 Speaker Recognition Evaluation Plan," NIST, Feb. 27, 2002, accessible at http://www.itl.nist.gov/iad/mig/tests/spk/2002/2002-spkrecevalplan-v60.pdf.
Andreas M. Olligschlaeger, Criminal Intelligence Databases and Applications, in Marilyn B. Peterson, Bob Morehouse, and Richard Wright, Intelligence 2000: Revising the Basic Elements—A Guide for Intelligence Professionals, 2000, a joint publications of IALEIA and LEIU, United States.
Auckenthaler, et al., "Speaker-Centric Score Normalization and Time Pattern Analysis for Continuous Speaker Verification," International Conference on Acoustics, Speech, and Signal Processing (ICASSP), vol. 2, Jun. 2000, pp. 1065-1068.
Audacity Team, "About Audacity," World Wide Web, 2014, accessible at http://wiki.audacity.team.org/wiki/About_Audacity.
Audioconferencing options. (Teleconference Units, Conference Bridges and Service Bureaus) (includes related articles on speech processing and new conferencing technology), Frankel, Elana, Teleconnect, v. 14, n. 5, p. 131(3), May 1996.
Beigi, et al., "A Hierarchical Approach to Large-Scale Speaker Recognition," EuroSpeech 1999, Sep. 1999, vol. 5; pp. 2203-2206.
Beigi, et al., "IBM Model-Based and Frame-By-Frame Speaker-Recognition," Speaker Recognition and its Commercial and Forensic Applications, Apr. 1998; pp. 1-4.

Beigi, H., "Challenges of Large-Scale Speaker Recognition," 3rd European Cooperation in the Field of Scientific and Technical Research Conference, Nov. 4, 2005.
Beigi, H., "Decision Theory," Fundamentals of Speaker Recognition, Chapter 9, Springer US, 2011; pp. 313-339.
Bender, W., et al., "Techniques for Data Hiding," IBM Systems Journal, vol. 35, Nos. 3&4, 1996.
Black, U., Voice Over IP, Second Edition, Prentice Hall 2002; 361 pages.
Boersma, et al., "Praat: Doing Phonetics by computer," World Wide Web, 2015, accessible at http://www.fon.hum.uva.nl/praat.
Bolton, et al., "Statistical Fraud Detection: A Review," Statistical Science, vol. 17, No. 3 (2002), pp. 235-255.
Boney, L., et al., "Digital Watermarks for Audio Signals" Proceedings of EUSIPCO-96, Eighth European Signal processing Conference, Trieste, Italy, 10-13 (1996).
Boney, L., et al., "Digital Watermarks for Audio Signals" Proceedings of the International Conference on Multimedia Computing Systems, p. 473-480, IEEE Computer Society Press, United States (1996).
BubbleLINK® Software Architecture (Science Dynamics 2003).
Bur Goode, Voice Over Internet Protocol (VoIP), Proceedings of the IEEE, vol. 90, No. 9, 1495-1517 (Sep. 2002).
Carey, et al., "User Validation for Mobile Telephones," International Conference on Acoustics, Speech, and Signal Processing (ICASSP), vol. 2, Jun. 2000, pp. 1093-1096.
Carlson, A. B., Communication Systems: An Introduction to Signals and Noise in Electrical Communication, Second Edition; pp. 15-49.
Chaudhari, et al., "Transformation enhanced multi-grained modeling for text-independent speaker recognition," International Conference on Spoken Language Processing, 2000, pp. 298-301.
Christel, M. G., et al., "Interactive Maps for a Digital Video Library", IEEE Special Edition on Multimedia Computing, pp. 60-67, IEEE, United States (2000).
Clavel, et al., "Events Detection for an Audio-Based Surveillance System," IEEE International Conference on Multimedia and Expo (ICME2005), Jul. 6-8, 2005, pp. 1306-1309.
Clifford J. Weinstein, MIT, The Experimental Integrated Switched Network—A System-Level Network Test Facility (IEEE 1983).
Coherent Announces Industry's First Remote Management System for Echo Canceller, Business Wire, Mar. 3, 1997.
Commander Call Control System, Rev. 1.04 (Science Dynamics 2002).
Cox, I. J., et al.; "Secure Spread Spectrum Watermarking for Multimedia," NEC Research Institute, Technical Report 95-10.
Defendant's Opening Claim Construction Brief, *Global Tel*Link Corporation v. Securus Technologies, Inc.*, Case No. 3:14-cv-0829-K (N.D. Tex.), filed Nov. 19, 2014.
Defendant's Responsive Claim Construction Brief, *Global Tel Corporation v. Securus Technologies, Inc.*, Case No. 3:14-cv-0829-K (N.D. Tex.), filed Dec. 10, 2014.
Definition of "constant", The American Heritage Dictionary, 4th Ed. (2002); p. 306.
Definition of "telephony", McGraw-Hill Dictionary of Scientific and Technical Terms, 6th Edition (McGraw-Hill, 2003).
Definitions of "suspicion" and "suspect", American Heritage Dictionary, 4th Edition, New York: Houghton Mifflin, 2006; pp. 1743-1744.
Doddington, G., "Speaker Recognition based on Idiolectal Differences between Speakers," Seventh European Conference on Speech Communication and Technology, Sep. 3-7, 2001; pp. 2521-2524.
Dunn, et al., "Approaches to speaker detection and tracking in conversational speech," Digital Signal Processing, vol. 10, 2000; pp. 92-112.
Excerpts from International Telecommunication Union, "Technical Characteristics of Tones for the Telephone Service," ITU-T Recommendation E.180/Q.35, Mar. 9, 1998; 19 pages.
Excerpts from McGraw-Hill Dictionary of Scientific and Technical Terms, 5th Edition, 1994; pp. 680 and 1560.
Excerpts from the Prosecution History of U.S. Appl. No. 10/135,878, filed Apr. 29, 2002.
Excerpts from Webster's Third New International Dictionary, Merriam-Webster Inc., 2002, pp. 2367-2368.

(56) References Cited

OTHER PUBLICATIONS

File History of U.S. Pat. No. 7,899,167, U.S. Appl. No. 10/642,532, filed Aug. 15, 2003.
File History of U.S. Pat. No. 8,630,726, U.S. Appl. No. 12/378,244, filed Feb. 12, 2009.
File History of U.S. Pat. No. 8,886,663, U.S. Appl. No. 12/284,450, filed Sep. 20, 2008.
File History of U.S. Pat. No. 9,225,838, U.S. Appl. No. 13/958,137, filed Aug. 2, 2013.
Fraser et al., "Over-All Characteristics of a TASI System," The Bell System Technical Journal, Jul. 1962; pp. 1439-1454.
Furui, et al., "Experimental studies in a new automatic speaker verification system using telephone speech," Acoustics, Speech, and Signal Processing, IEEE International Conference on ICASSP '80, vol. 5, Apr. 1980, pp. 1060-1062.
Furui, S., "50 Years of Progress in Speech and Speaker Recognition Research," ECTI Transactions on Computer and Information Technology, vol. 1, No. 2, Nov. 2005, pp. 64-74.
Greene et al., "Media Gateway Control Protocol Architecture Requirements," Network Working Group, RFC 2805, Apr. 2000; 45 pages.
Hansen, et al., "Speaker recognition using phoneme-specific gmms," The Speaker and Language Recognition Workshop, May-Jun. 2004.
IETF Mail Archive, Internet Archive Wayback Machine, Aug. 25, 2016, retrieved from https://mailarchive.ietf.org/archlsearchl?qRFC3389.
Inmate Telephone Services: Large Business: Voice, Oct. 2, 2001.
International. Search Report and Written Opinion directed to International Patent Application No. PCT/US17/19723, dated Mar. 23, 2017; 8 pages.
International Search Report for International Application No. PCT/US04/025029, dated Mar. 14, 2006.
Isobe, et al., "A new cohort normalization using local acoustic information for speaker verification," Proceedings of the IEEE International Conference on Acoustics, Speech, and Signal Processing, vol. 2, Mar. 1999; pp. 841-844.
Jeff Hewett and Lee Dryburgh, Signaling System No. 7 (SS7/C7): Protocol, Architecture, and Services (Networking Technology) at 85 (Cisco Press, Jun. 2005).
Johnston, et al., "Session Initiation Protocol Services Examples," Best Current Practice, RFC 5359, Oct. 2008, pp. 1-170.
Juang, et al., "Automatic Speech Recognition—A Brief History of the Technology Development," Oct. 8, 2014.
Kinnunen, et al., "Real-Time Speaker Identification and Verification," IEEE Transactions on Audio, Speech, and Language Processing, vol. 14, No. 1, Jan. 2006, pp. 277-288.
Knox, "The Problem of Gangs and Security Threat Groups (STG's) in American Prisons Today: Recent Research Findings From the 2004 Prison Gang Survey," National Gang Crime Research Center, 2005; 67 pages.
Lane, I. R., et al., "Language Model Switching Based on Topic Detection for Dialog Speech Recognition," Proceedings of the IEEE-ICASSP, vol. 1, pp. 616-619, IEEE, United States (2003).
Maes, et al., "Conversational speech biometrics," E-Commerce Agents, Marketplace Solutions, Security Issues, and Supply and Demand, Springer-Verlang, London, UK, 2001, pp. 166-179.
Maes, et al., "Open SESAME! Speech, Password or Key to Secure Your Door?," Asian Conference on Computer Vision, Jan. 1998; pp. 1-3.
Matsui, et al., "Concatenated Phoneme Models for Text-Variable Speaker Recognition," International Conference on Acoustics, Speech, and Signal Processing (ICASSP), vol. 2, Apr. 1993; pp. 391-394.
Moattar, et al., "Speech Overlap Detection Using Spectral Features and its Application in Speech Indexing," Second International Conference on Information & Communication Technologies, 2006; 5 pages.
National Alliance of Gang Investigators Associations, 2005 National Gang Threat Assessment, 2005, pp. vi and 5-7, Bureau of Justice Assistance, Office of Justice Programs, U.S. Department of Justice.
National Major Gang Task Force, A Study of Gangs and Security Threat Groups in America's Adult Prisons and Jails, 2002, United States.
Navratil, et al., "A Speech Biometrics System with Multi-Grained Speaker Modeling," Proceedings of Kovens 2000; 5 pages.
Navratil, et al., "Phonetic Speaker Recognition using Maximum-Likelihood Binary-Decision Tree Models," Proceedings of the IEEE International Conference on Acoustics, Speech, and Signal Processing, Apr. 6-10, 2003; 4 pages.
Newton's Telecom Dictionary, 18th Edition, Feb. 2002, p. 168, section "coding theory".
Office Action dated Dec. 1, 2011, in Canadian Patent Application No. 2,534,767, DSI-ITI, LLC, filed Aug. 4, 2004.
Olligschlaeger, A. M., "Criminal Intelligence Databases and Applications", in Marilyn B. Peterson, Bob Morehouse, and Richard Wright, Intelligence 2000: Revising the Basic Elements—A Guide for Intelligence Professionals, 2000, a joint publication of IALEIA and LEIU, United States.
Original Specification as-filed Aug. 26, 2005, in U.S Appl. No. 11/212,495 to Frost.
Original Specification as-filed Jul. 22, 2005, in U.S. Appl. No. 11/187,423 to Shaffer.
Osifchin, N., "A Telecommunications Buildings/Power Infrastructure in a New Era of Public Networking," IEEE 2000.
PacketCableTM 1.0 Architecture Framework Technical Report, PKT-TR-ARCH-V0 1-001201 (Cable Television Laboratories, Inc. 1999).
Pages from http://www.corp.att.com/history, archived by web.archive.org on Nov. 4, 2013.
Pelecanos, J. "Conversational biometrics," in Biometric Consortium Meeting, Baltimore, MD, Sep. 2006, accessible at http://www.biometrics.org/bc2006/presentations/Thu_Sep_21/Session_I/Peleca nos_Conversational_Biometrics.pdf.
Perkins, C., RTP Audio and Video for the Internet, Pearson Education, 2003.
Pfaffenberger, B., Webster's New World Dictionary of Computer Terms, Eighth Edition, 2000; p. 22.
Photocopy of "Bellcore Notes on the Networks (Formerly BOC Notes on the LEC Networks)," Bellcore, Special Report SR-2275, Issue 3, Dec. 1997.
Pollack, et al., "On the identification of Speakers by Voice," The Journal of the Acoustical Society of America, vol. 26, No. 3, May 1954.
Postel, J., "User Datagram Protocol," ISI, RFC 768, Aug. 28, 1980; 3 pages.
Proakis, John G., Digital Communications, Second Edition, McGraw-Hill, Inc. 1989; pp. 148-157.
Prosecution History of U.S. Appl. No. 10/910,566, filed Aug. 4, 2004.
Prosecution History of U.S. Appl. No. 11/480,258, filed Jun. 30, 2006.
Prosecution History of U.S. Appl. No. 12/002,507, filed Dec. 17, 2007.
Rey, R.F., ed., "Engineering and Operations in the Bell System," 2nd Edition, AT&T Bell Laboratories: Murray Hill, NJ, 1983.
Reynolds, D., "Automatic Speaker Recognition Using Gaussian Mixture Speaker Models," The Lincoln Laboratory Journal, vol. 8, No. 2, 1995; pp. 173-192.
Rosenberg et al., "SIP: Session Initiation Protocol," Network Working Group, Standards Track, RFC 3261, Jun. 2002, 269 pages.
Rosenberg, et al., "The Use of Cohort Normalized Scores for Speaker Verification," Speech Research Department, AT&T Bell Laboratories, 2nd International Conference on Spoken Language Processing, Banff, Alberta, Canada, Oct. 12-16, 1992.
Ross, et al., "Multimodal Biometrics: An Overview," Proc. of 12th European Signal Processing Conference (EUSIPCO), Vienna, Austria, Sep. 2004, pp. 1221-1224.
Russell, T., Signaling System #7, Fourth Edition, McGraw-Hill, 2002; 532 pages.

(56) References Cited

OTHER PUBLICATIONS

Schulzrinne et al., "RTP: A Transport Protocol for Real-Time Applications," Network Working Group, RFC 3550, Jul. 2003; 89 pages.
Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html(archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_maim.htm (archived by web.archive.org on Oct. 12, 2000).
Shearme, et al., "An Experiment Concerning the Recognition of Voices," Language and Speech, vol. 2, No. 3, Jul./Sep. 1959.
Silberg, L. "Digital on Call," HFN The Weekly Newspaper for the Home Furnishing Network, p. 97, Mar. 17, 1997.
Statement for the Record of John S. Pistole, Assistant Director, Counterterrorism Division, Federal Bureau of Investigation, Before the Senate Judiciary Committee, Subcommittee on Terrorism, Technology, and Homeland Security, Oct. 14, 2003.
Supplementary European Search Report for EP Application No. EP 04 80 9530, Munich, Germany, dated Mar. 25, 2009.
Tirkel, A., et al.; "Image Watermarking—A Spread Spectrum Application,".
U.S. Appl. No. 60/607,447, "IP-based telephony system and method," to Apple, et al., filed Sep. 3, 2004.
Viswanathan, et al., "Multimedia Document Retrieval using Speech and Speaker Recognition," International Journal on Document Analysis and Recognition, Jun. 2000, vol. 2; pp. 1-24.
Weisstein, Eric W., "Average Power," MathWorld—A Wolfram Web Resource, 1999, retrieved from http://mathworld.wolfram.com/AveragePower.html.
Wozencraft et al., Principles of Communication Engineering, 1965; pp. 233-245.
Zajic, et al., "A Cohort Methods for Score Normalization in Speaker Verification Systme, Acceleration of On-Line Cohort Methods," Proceedings of the 12th International Conference "Speech and Computer," Oct. 15-18, 2007; 6 pages.
Zopf, R., "Real-time Transport Protocol (RTP) Payload for Comfort Noise," Network Working Group RFC 3389, Sep. 2002; 8 pages.

* cited by examiner

```
                                                    800
v=0
o=Nate 2090844916 2090844916 IN IP4 192.168.209.1
s=                                              ⌒
                                               810
c=IN IP4 192.168.209.1
t=0 0
m=audio 49170 RTP/AVP 0 8 18
                              820
a=rtpmap:0 PCMU/8000
                         822
a=rtpmap:8 PCMA/8000
                         824
a=rtpmap:18 G729/8000
                         826
a=fmtp:18 annexb=yes
                       828
```

```
                                                    850
v=0
o=Nick 2090844916 2090844916 IN IP4 192.168.209.2
s=                                              ⌒
                                               860
c=IN IP4 192.168.209.2
t=0 0
m=audio 49170 RTP/AVP 0
                         862
a=rtpmap:0 PCMU/8000
                        864
```

FIG. 8

```
                                                          900
v=0 o=Nate 2090844916 2090844916 IN IP4 192.168.209.1
                                                    902
s= c=IN IP4 192.168.209.1 t=0 0 m=audio 49170 RTP/AVP 18
                         904
a=rtpmap:18 G729/8000
                      906
a=fmtp:18 annexb=yes
                    908
```

```
                                                          920
v=0 o=Nick 2090844916 2090844916 IN IP4 192.168.209.2
                                                    922
s= c=IN IP4 192.168.209.2 t=0 0 m=audio 49170 RTP/AVP 18
                         924
a=rtpmap:18 G729/8000
                      926
```

FIG. 9A

```
                                                      940
v=0
o=Nate 2090844916 2090844916 IN IP4 192.168.209.1
s=                                              ⎱
                                                942
c=IN IP4 192.168.209.1
t=0 0
m=audio 49170 RTP/AVP 0
                        944
a=rtpmap:0 PCMU/8000
                     946
```

```
                                                      960
v=0
o=Nick 2090844916 2090844916 IN IP4 192.168.209.2
s=                                              ⎱
                                                962
c=IN IP4 192.168.209.2
t=0 0
m=audio 49170 RTP/AVP 0
                        964
a=rtpmap:0 PCMU/8000
                     966
```

FIG. 9B

UTILIZING VOIP CODEC NEGOTIATION DURING A CONTROLLED ENVIRONMENT CALL

FIELD

The disclosure relates to communication systems for controlled-environment facilities and detection of fraudulent telephone activity between an inmate and a called party in a Voice over Internet Protocol (VoIP) environment.

BACKGROUND

Controlled-environment communication systems are telecommunication systems designed to enable members within a controlled-environment facility to communicate with parties outside of that facility. These systems allow telecommunications activities for the populations of those facilities to be highly regulated. They are designed with security measures and apparatus that enable administrators of such facilities to set policies for allowed and disallowed activity, to monitor voice calls to detect members within the facility engaging in disallowed activities, and also to bill parties on the call as appropriate. These systems are designed for many contexts in which monitoring of telecommunications activity is desirable, such as health facilities, military facilities, and correctional facilities such as prisons. The prison application has an especially urgent need for strong security measures and apparatus. In the prison context, a controlled-environment communication system is commonly referred to as an inmate communication system (ICS).

Prison inmate communication is highly circumscribed because of the potential for abuse. Inmates have been known to use inmate communication systems in the past to engage in illicit activity outside of the prison, threaten parties of interest such as judges, attorneys, and witnesses, and communicate with inmates in other prison facilities about possibly illegal activity. As such, several security measures have been developed for use with these systems over the past several decades. Combinations of several features such as personal identification number (PIN) entry, biometric validation of inmates such as voice print identification, allowed and disallowed contact lists, physical phone enclosures, and so on are all features in an ICS. These features allow call requests by inmates to be validated such that only valid requests, such as an inmate requesting a call to a family member evaluated as a non-threat, are allowed at the onset of the call request.

During a voice call itself, a common class of circumvention attempt involves the cooperation of an allowed called party. An inmate within the facility may contact an allowed called party without triggering any security issues in an ICS, and the called party may assist the inmate in contacting a third party for nefarious purposes using features commonly available to public telephone network customers. Three-way calling is a prime example: an allowed called party can establish a three-way call with a third party, which then allows an inmate and the third party to communicate using a call session originally established between the inmate and the allowed called party. Thus, contact between the inmate and the undesirable third party evades detection by the prison security apparatus.

In response, several schemes have been developed to detect three-way calling attempts. Several techniques fall under the umbrella of "sound detection," in which sounds associated with three-way call activity are detected. One such method is the detection of a loud "clicking" sound called a "hookflash," "switchhook," or "flashhook" that is made when a called party switches to a different line to initiate a call session with a third party. To detect this sound, the energy of the call audio is used to detect a short burst of energy over the call session that exceeds a threshold. Another common scheme infers a three-way call attempt by detecting an extended period of silence. This detection scheme is based on the observation that the called party leaves the call session with the inmate for some period of time to initiate a call session with a third party, and thus the inmate call session may be silent for some amount of time.

As voice communication shifts towards Voice over Internet Protocol (VoIP), key validation and detection features have become jeopardized. VoIP operates on a "packet-switch" paradigm, in which packets representing samples of encoded voice are sent between speakers on a voice call where packets do not require a dedicated circuit to be established for the entire path between the call parties. VoIP packets are formatted according to a codec (a portmanteau of "coder-decoder") which defines how sound is represented and sent within each VoIP packet.

In order to save network capacity when transmitting VoIP packets, an ICS may utilize codecs that compress sound data into a quality that is high enough to be understood by a human listener, but low enough that the network capacity required to transmit such packets is much lower than other, higher quality sound codecs. However, codecs that perform such compression of the audio may also hinder the use of techniques that depend on sound detection to function due to the lower quality of the audio. Therefore, a solution is required that allows high quality audio codecs to be used for sound-based validation and detection measures and lower quality audio codecs to be used for regular audio.

SUMMARY

In an embodiment, a call processing system receives a request, from an inmate calling party via an interface device, to setup a voice call between the inmate calling party and an outside called party. A voice connection is setup up between the call processing system and the interface device where voice data is encoded using a first codec, and the setup request is validated using biometric validation. Subsequently, the call processing system sends an offer message to the interface device to renegotiate the voice connection to utilize a second codec, and receives an accept message from the interface device, at which point the voice data exchanged between the call processing system and the interface device is encoded with the second codec. The call processing system then sets up a voice connection with the outside called party where voice data is encoded using the second codec. Finally, the call is established between the inmate calling party and the outside called party via the call processing system, where voice data exchanged between the two call parties is entirely encoded using the second codec.

In another embodiment, the call processing system may determine during an ongoing call that network capacity issues or security concerns may warrant changing the codec currently being used to serve the call. The call processing system monitors bandwidth usage of the system to determine if the available network capacity warrants changing the operative codec from a first codec to a second codec. The call processing system may also determine that security conditions of the call, such as the security risks posed by either the inmate calling party or the outside called party, warrants changing the operative codec from a first codec to a second codec. If either of these conditions are met, the call processing system initiates a codec renegotiation with the inmate calling party by sending an offer message to the interface device to renegotiate the voice connection to utilize a second codec, and receives an accept message from the interface device, at which point the voice data exchanged between the call processing system and the interface device is encoded with the second codec. The call processing system also initiates a codec renegotiation with the outside called party by sending an offer message to renegotiate the voice connection to utilize a second codec, and receives an accept message from the outside calling party, at which point the voice data exchanged between the outside called party and the call processing system is encoded with the second codec. The call may then be monitored or recorded to perform various security-related functions, such as biometric analysis, sound detection analysis and keyword analysis.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

FIG. 8 illustrates the contents of Session Description Protocol (SDP) messages according to an embodiment.

FIGS. 9A-B illustrate the contents of another set of Session Description Protocol (SDP) messages according to an embodiment.

Figure 10:
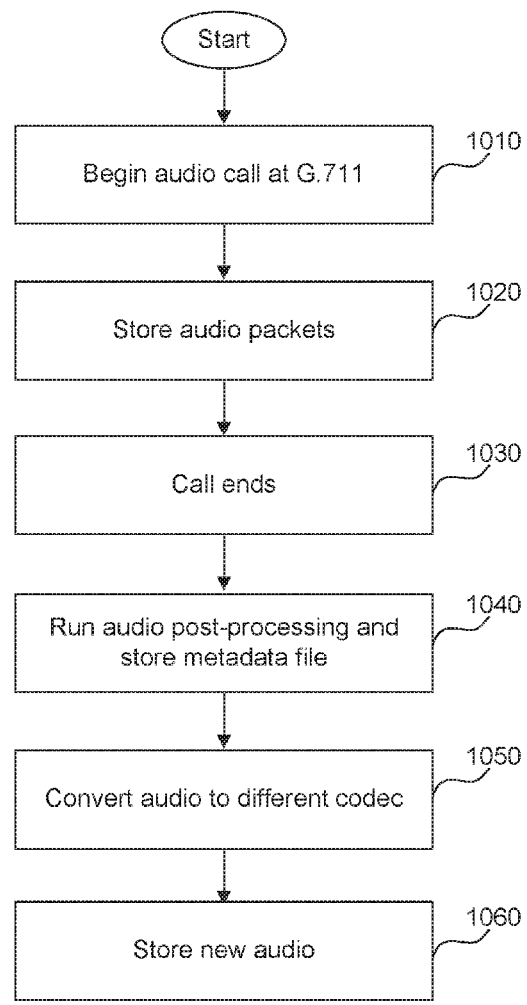

FIG. 10 illustrates an operational flowchart for call recording according to an embodiment.

Figure 11:
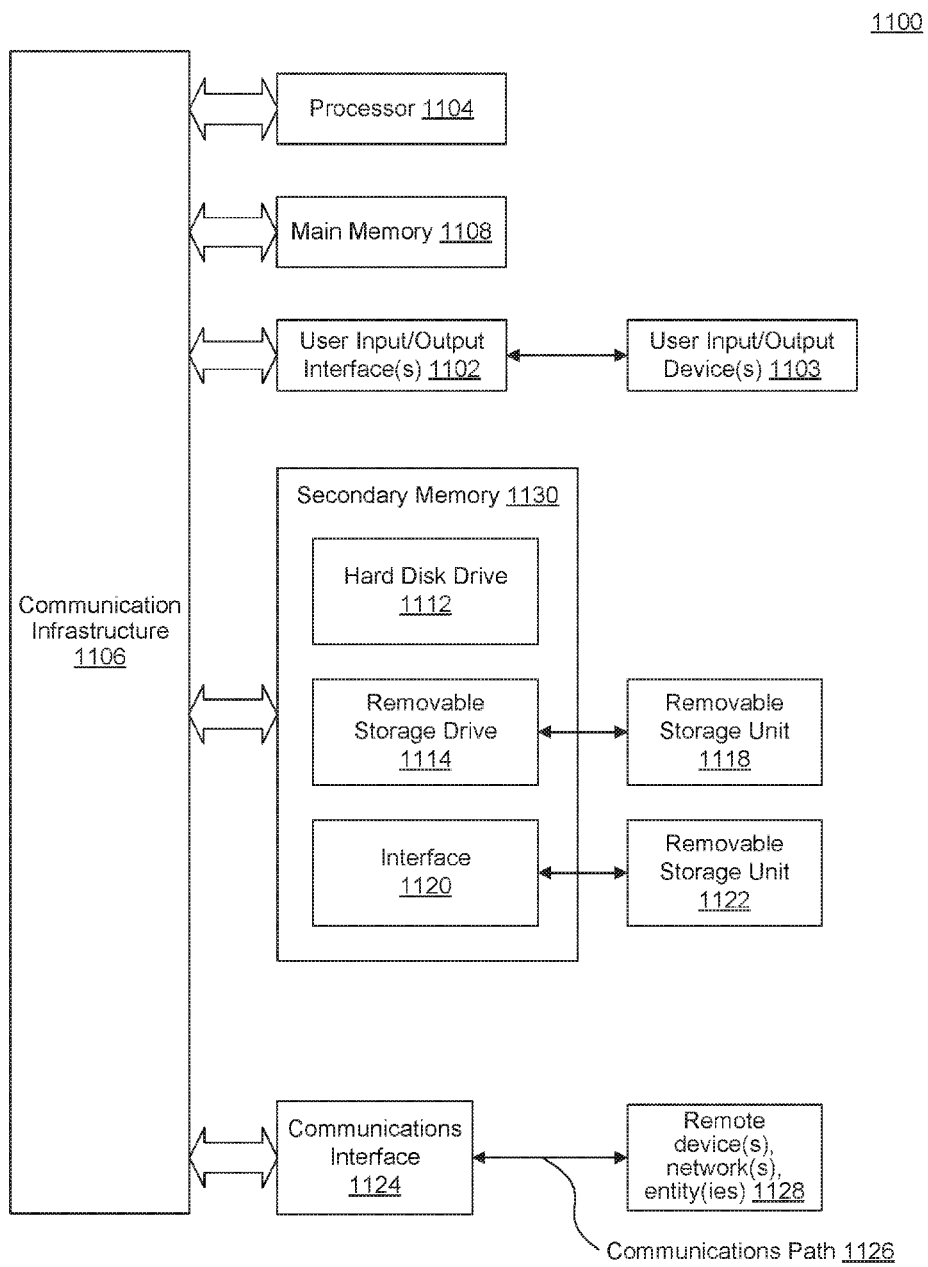

FIG. 11 illustrates a computer system, according to exemplary embodiments of the present disclosure.

Table 1 illustrates several SIP request message types, according to exemplary embodiments of the present disclosure.

Table 2 illustrates several SIP response message types, according to exemplary embodiments of the present disclosure.

Table 3 illustrates the content of SIP request and response messages, according to exemplary embodiments of the present disclosure.

Table 4 illustrates the content of SDP messages, according to exemplary embodiments of the present disclosure.

The present disclosure will be described with reference to the accompanying drawings. In the drawings, like reference numbers indicate identical or functionally similar modules.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following detailed description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Communication System

Figure 1:
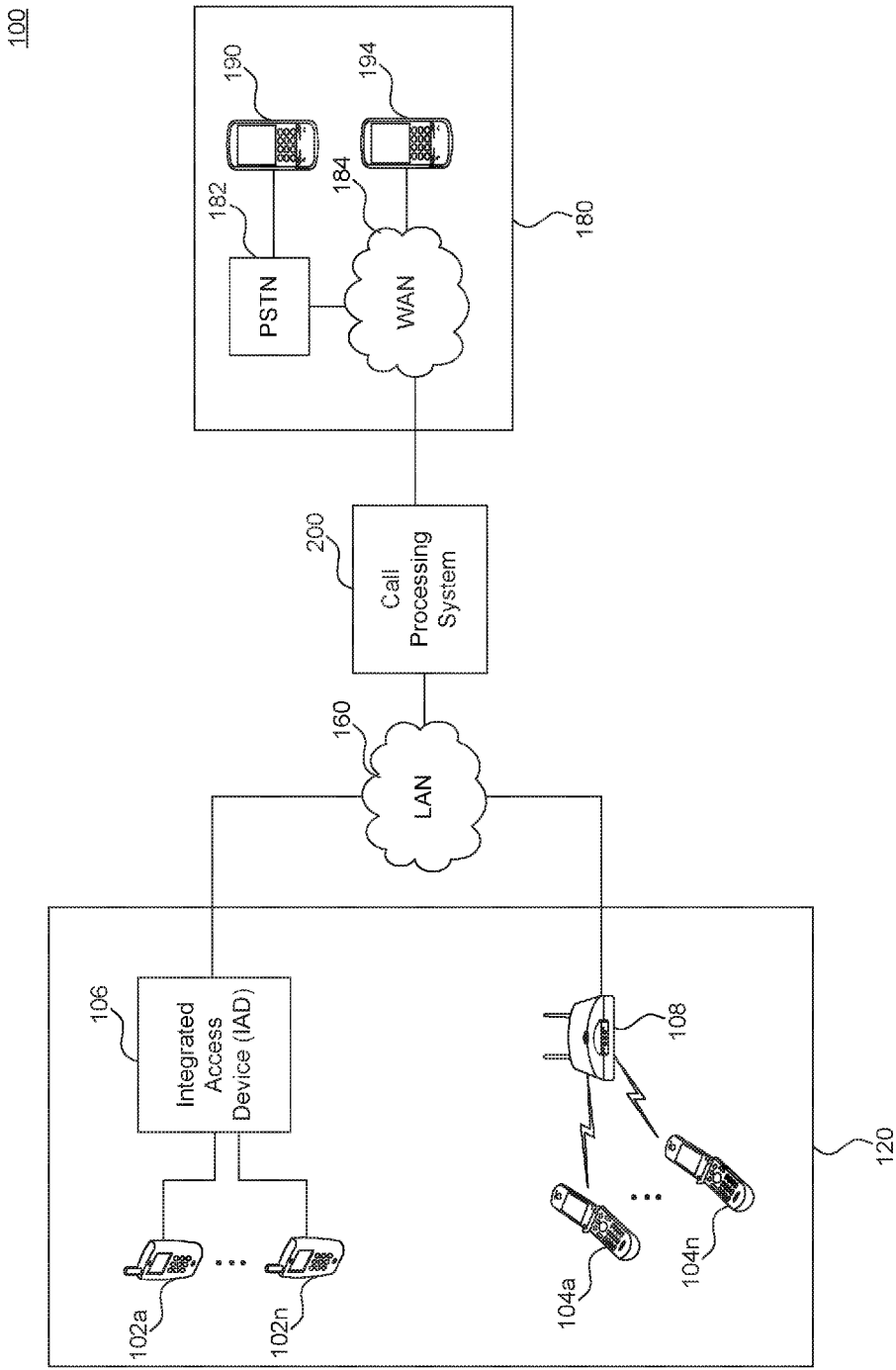
FIG. 1 illustrates a block diagram of a communication system, according to exemplary embodiments of the present disclosure.

FIG. 1 depicts a functional diagram of a prison communication system 100 according to exemplary embodiments of the present disclosure. The communication system comprises prison facility 120, a local area network (LAN) 160, call processing system 200, and connects to a public telephone network 180. The call processing system 200 is also referred to as an inmate calling system (ICS). Within prison facility 120, multiple landline terminals 102a-n are connected to an integrated access device (IAD) 106. These terminals 102a-n may be phones capable of Voice over Internet Protocol (VoIP), in which case IAD 106 functions as a packet router which routes VoIP data and Session Initiation Protocol (SIP) messaging packets through LAN 160 and to call processing system 200. If the phones are traditional phone lines, for example analog "plain old telephony service" (POTS) or integrated services digital network (ISDN) lines, IAD 106 performs digital encoding and packetization of voice data to be routed through LAN 160.

The IAD 106 may exist in several configurations. In cases where the terminals 102a-n are VoIP-capable phones, IAD 106 may simply serve to aggregate all packetized voice and signaling data to be transported across an access link trunk to LAN 160. In cases where the terminals act on legacy phone technologies such as analog or ISDN lines, IAD 106 may also perform Foreign Office Station (FXS) and Foreign Exchange Office (FXO) functionality along with VoIP gateway (VoIP GW) functionality. The FXS/FXO functionality, paired together, allows for the interworking between legacy telephone signals, such as POTS or ISDN, and a VoIP network. In such cases, the signal between IAD 106 and the LAN would be VoIP packetized voice and signaling, and VoIP voice and signaling data routed to the inmate terminals 102a-n would be translated by IAD 106 to legacy telephone signals compatible with the inmate terminals.

Wireless terminals 104a-n may also be available to inmates to perform voice calls. These calls will be routed through wireless access point 108, which will route all voice packets to LAN 160. Typically these wireless terminals will be VoIP-capable, such that any voice data is transmitted as digitally-encoded packetized data, but in cases where they are not, either access point 108 or elements in LAN 160 may be capable of translating the signaling to VoIP. Wireless access point 108 may be an access point operating on a common wireless standard such as IEEE 802.11, or a commercially available base station operating on 3G or 4G standards such as Universal Mobile Telecommunication System (UMTS), Global System for Mobile Communications (GSM), Long-term Evolution (LTE), etc. The base station could be a "small-cell" or "femtocell" technology similar to a commercially available base station meant to cover smaller or confined areas. In any case, security parameters and settings available with the equipment allow secure transmission of voice and other data to LAN 160.

In many embodiments, terminals 102a-n and 104a-n may be equipped with security measures that serve as early validation prior to initiating a voice call. To use the terminal, for example, an inmate may need to enter a personal identification number (PIN) before being allowed to input anything related to contacting an outside party. The terminals may be equipped with a fingerprint scanner and other features. The terminals may also be encased within an enclosure, such as a security cage around the terminal itself or a secure room which requires certain permissions to access, perhaps being guarded by live security as well as being subject to all manner of code entry and automatic scanning techniques. These features serve as a first line of defense against fraudulent activity.

LAN 160 routes voice data between the prison facility and the call processing system 200. LAN 160 is comprised of switches and routers common in typical data networks. These devices may be privately owned and operated by the prison facility, prison authority in control of multiple facilities, or a service provider serving several prison facilities, or it may be part of the public internet.

Call processing system 200 contains the essential functions for routing calling parties within prison facility 120 and outside parties connected to public telephone networks. In an embodiment, call processing system 200 is located remotely from the prison facility, and has the computing resources perform call processing for multiple prison facilities. However, in some embodiments, call processing system 200 may be placed within a prison facility. Call processing system 200, following the appropriate validation and control steps, then routes calls to the public telephone network 180, and more specifically to public switched telephone network (PSTN) 182 or wide area network (WAN) 184 as appropriate. Called terminal 190 or 194 then receives the voice call. For called terminal 194, the phone will be reached directly through WAN 184. Terminal 194 is VoIP-capable, and thus receives and sends VoIP signaling (i.e., packetized voice and signaling messages).

In the case of called terminal 190, routing may be determined by the call processing system itself or within WAN 184 by an E.164 Number to URI Mapping (ENUM) server, which maps between SIP Universal Resource Identifier (URI) and PSTN-compatible telephone numbers. In the former case, the call processing system will connect directly with PSTN 182. In the latter case, the VoIP signal will be translated to a PSTN-compatible voice signal through a Media Gateway (MG) using Media Gateway Control Protocol (MGCP) and a signaling gateway that translates SIP signaling to PSTN-compatible signaling to interface between VoIP and PSTN networks. In such cases, the call processing system both sends and receives VoIP data and SIP messaging packets, while the conversion of VoIP and SIP signaling is handled by the elements within the WAN and is transparent to the prison system.

Codecs are negotiated using Session Description Protocol (SDP) data that is contained within individual SIP messages. SIP messages can be triggered by call processing system 200 or by the calling parties such as terminals 102a-n, 104a-n or called terminals 190 and 194. SDP data will be described in greater detail below.

Call Processing System

Figure 2:
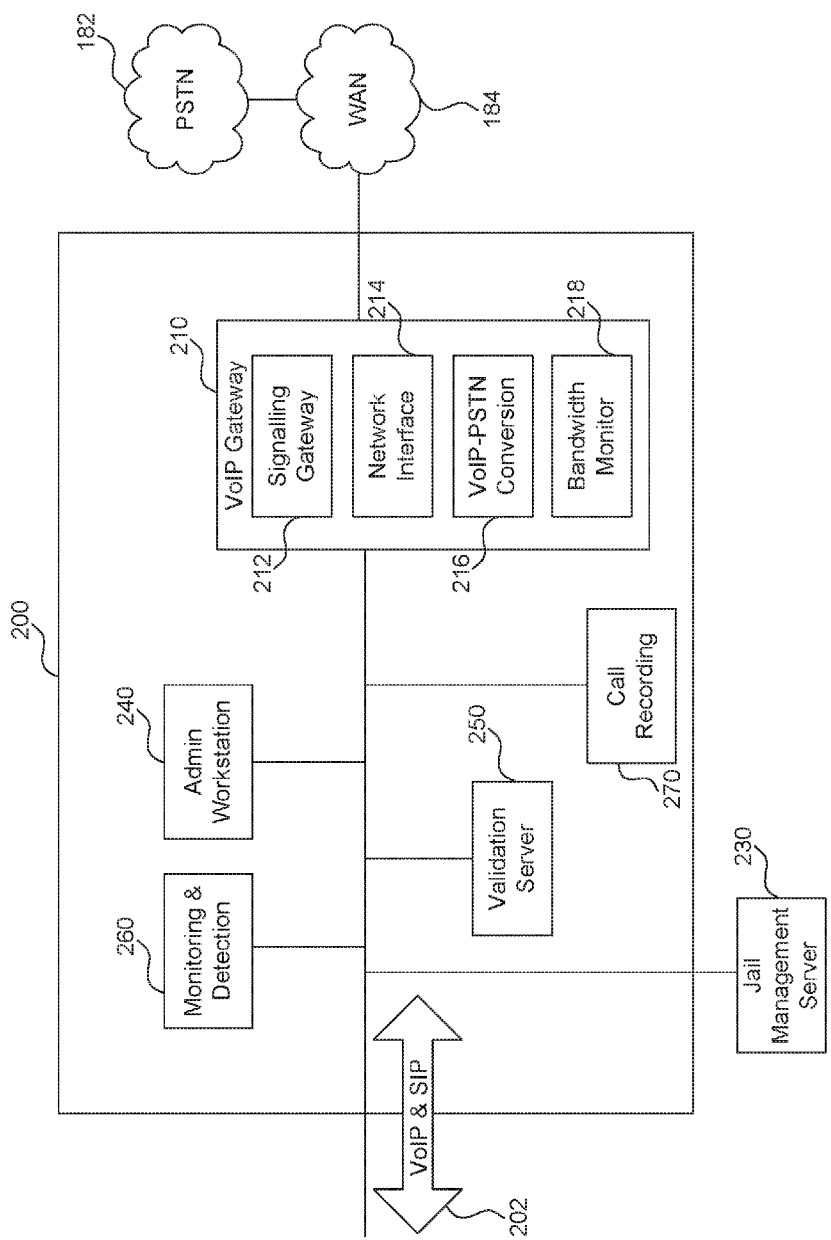
FIG. 2 illustrates a block diagram of a call processing system, according to exemplary embodiments of the present disclosure.

FIG. 2 depicts call processing system 200 as shown in FIG. 1, according to exemplary embodiments of the present invention. Call processing system 200 includes VoIP gateway (VoIP GW) 210, monitoring and detection (M&D) module 260, validation server 250, administrative workstation 240, and call recording module 270. Call processing system 200 also has a persistent connection to jail management server (JMS) 230. These modules handle the processing, validation, routing, and monitoring of voice calls, as well as any actions taken in response to confirmed infractions. Those skilled in the art will appreciate that the specific embodiment disclosed is not limiting to the placement of essential functions, such that they may be placed at varying locations in the prison communication system 100. Call processing system 200 itself may be centralized such that it handles calls from multiple prison facilities, or may be located on-site at a prison facility based on various design factors. Functions may be split between call processing system 200 (which may be centralized), prison facility 120, and LAN 160 as appropriate.

VoIP signaling 202 that is sent between prison facility 120 and call processing system 200 contains the two data streams, voice data and SIP messaging, as described above. Both streams are transmitted as packetized data, where SIP is transmitted using a reliable transport protocol such as TCP/IP. SIP signaling requires reliable transport because of its importance in governing the routing and communication between the call end points. SDP messages are transmitted as part of the body of various SIP messages. The voice data is packetized and transported using the Real-time Transport Protocol (RTP). RTP is a well-known protocol specifically designed for transporting streaming data such as voice and video. RTP is designed to be delay-sensitive due to the nature of streaming data, and loss-tolerant to help satisfy the delay sensitivity.

VoIP GW 210 can consist of any number of servers, and acts as a point of contact between prison communication system 100, including call processing system 200 and prison facility 120 (or multiple prison facilities), and WAN 184. VoIP GW 210 acts to control a call session between the inmate calling party and outside called party. VOIP GW 210 comprises three functional modules, signaling gateway 212, network interface 214, and VoIP-PSTN conversion module 216. Signaling gateway 212 is responsible for receiving SIP signaling from the inmate and outside call parties, and performing any signal translation or field replacement as necessary. During codec negotiations and renegotiations, signaling gateway 212 generates the appropriate SIP and SDP messaging to initiate a codec negotiation or accept the terms of a codec negotiation initiated by one of the call parties. Network interface 214 is responsible for routing packets to and from call processing system 200, routing both the SIP and RTP packets to WAN 184 and receiving them from WAN 184 and routing back to LAN 160 for delivery to the inmate terminals. VoIP GW 210 also routes packets to the various modules within call processing system 200 as appropriate for security and recording purposes, and can gather statistics on various performance metrics for all of its handled call sessions.

VoIP GW 210 may also interface directly with a PSTN network 182, providing the interworking functionality that is also provided in WAN 184 by way of the MG and MGCP. Therefore, VoIP GW 210 may act as a "translator" between VoIP signaling 202, including the voice data (RTP) packets and the SIP messaging packets, and PSTN-compatible signaling, including the circuit-switched sound through an Integrated Services Digital Network (ISDN) and control signaling such as Signaling System 7 (SS7) ISDN Signaling User Part (ISUP) signaling. To enable that translation, VoIP GW 210 contains VoIP-PSTN conversion module 216 in addition to signaling gateway 212 and network interface 214. Signaling gateway 212 provides the signaling translation between SIP and SS7 ISUP signaling messages, VoIP-PSTN conversion module 216 provides the translation between VoIP RTP and PSTN circuit-switched sound, and network interface 214 provides the hardware to allow the gateway to interface with both a data network via LAN 160 and PSTN 182.

Finally, VoIP GW 210 may also contain a bandwidth monitor 218 to determine how much bandwidth is being consumed to serve all calls from the correctional facility. Because all voice packets to and from the inmate callers passes through VoIP GW 210, VoIP GW 210 is an ideal place to measure the bandwidth consumption due to voice data. Bandwidth monitor 218 can keep track of the data rate being served by VoIP GW 210 to serve voice calls at every given moment, and VoIP GW 210 can refer to the bandwidth monitor periodically to determine if codecs should be renegotiated either because bandwidth utilization is too high and some voice calls need to be moved to a codec optimized for low bandwidth utilization, or because bandwidth utilization is low and some voice calls can be renegotiated to use a higher sound quality codec.

Jail management server (JMS) 230, often referred to as an offender management server (OMS), can consist of one or many servers, and hosts a database that stores broad information on inmates and outside called parties regarding behavioral history. JMS 230 is maintained by the prison facility administration, and in various embodiments may be located on-site at the prison facility, within the call processing system or in a remote location. The behavioral history will contain information regarding an inmate's past infractions within the prison itself (e.g., altercations with other inmates) and also infractions related to telephone behavior. JMS 230 maintains class of service information that specifies the parties that each inmate is allowed to call ("allowed lists") and/or the parties it is not allowed to call ("block lists"), which outside parties have special allowances to perform certain activities such as three-way calling or call-forwarding (e.g., an attorney may have special privileges to conference in a third party), allowed call durations, etc. Similar information is kept on called parties outside of the prison. JMS 230 also serves as a repository that the other call processing system modules may refer to when performing security-related functions. In particular, administrative workstation 240 may receive data about inmates to create policies for corrective action when inmates engage in illicit behavior.

Validation server 250 handles the validation steps required before a call is initiated with the public telephone network. Validation server 250 may work in conjunction with data sent from the terminals related to biometric validation. In an embodiment, validation server 250 stores fingerprint samples and voice print samples of each inmate, so that when an inmate attempts to use the system, various comparison test can be performed to determine that the inmate has properly identified himself and is allowed to make a voice call. Validation server 250 may also handle PIN inputs by the inmate. Validation server 250 also checks to ensure that the intended called party is allowable for that specific inmate by checking against data contained in JMS 230. After validation server 250 has performed these validation steps, the call is allowed by the VOIP GW 210.

In an embodiment, validation server 250 accepts VoIP packets from VoIP signaling 202 to perform comparisons of an inmate's voice with a voiceprint for the inmate that is also stored within the validation server. Validation server 250 may prompt an inmate attempting to make a phone call to speak their name or a key phrase to obtain a speech sample from the inmate.

Validation server 250, with knowledge of the codec being used to encode the VoIP signal from the inmate, can then reproduce the inmate's speech sample at the level of sound quality that is enabled by that codec. Validation server 250 can then perform speaker recognition in which speech characteristics such as the vibration rate of a speaker's vocal chords, resonant frequencies in their speech, and various other physiological characteristics are derived from the speech sample, and compared to the inmate's voice print sample. Therefore, to ensure the accuracy of tests performed by validation server 250, the codec used at the time of those tests should reproduce sound with a high quality. After the validation is complete, the codec may be renegotiated to produce a lower quality sound to save network resources for call processing system 200.

Administrative workstation 240 is a set of terminals which may be used by prison security personnel to perform real-time corrective actions when illicit activity is detected in a phone call. These actions may include automated actions such as disconnecting a call, issuing a pre-recorded warning on the call, informing law enforcement, or live monitoring the call. If a call is flagged as a potential three-way call or a forwarded call, a guard or other official may listen to that call and issue a warning, disconnect the call, or otherwise flag the call for further scrutiny.

Administrative workstations 240 receive information about inmate histories from JMS 230, and may also be used by prison facility personnel to make live changes to JMS 230, including making changes to the class of service lists, adding, removing or otherwise flagging allowed called party numbers for a particular inmate, and logging additional infractions into the behavior history data. Information such as allowed or block lists which are stored in JMS 230 may be sent from JMS 230 to administrative workstations 240 so that the workstations can set corrective action policies when inmates communicate with disallowed call parties. The behavior history data may be stored locally within administrative workstations 240 to be used as input when setting corrective action policies for an inmate's calls.

M&D module 260 may contain one or many servers, and is designed to perform automated call monitoring, suspected infraction detection, and corrective actions for each call, including the use of SIP signaling as in exemplary embodiments of the present invention. M&D module 260 receives all data associated with a VoIP call, including the voice data (RTP) and the SIP signaling packets, to perform detections as required. M&D module 260 keeps information of the encoding and decoding (codec) schemes of a particular call and is capable of decoding all RTP packets to perform common methods for detecting illicit activity. Therefore, voice data packets can be decoded into sound so that sound-dependent techniques such as voice recognition, silence detection, hookflash detection, and continuous noise detection can be performed on the sounds as in existing three-way calling detection methods.

Codecs

Codecs (a portmanteau of "coder" and "decoder") are algorithms that are used to encode sound from an analog source into a digital format for packetized, low-volume transmission. In a telecommunications setting, a device or software program reads in a sound source, in this case voice from a telephone terminal, and converts the sound into a series of digital bits. These bits are then packaged into packets and transmitted via a transmitter over a given medium to a receiver. The receiver can then decode the bits received and convert them back to sound that is comprehensible to a listener on the receiver side. The receiver and transmitter may negotiate which codec is being used prior to the transmission of sound. In embodiments, a transmitter and receiver may negotiate the operative codec prior to commencing a call, and may renegotiate the codec mid-call if desired.

Typically, a codec has an overall bitrate, a sampling rate, a packets per second rate, and a packet payload size. The overall bitrate is the number of bits per second (bps) that are sent to represent the sound. The sampling rate is the number of samples per second that are taken to represent the audio. The packets per second is the number of individual voice packets that are sent per second. The packet payload size is the number of bits carried in each voice packet to represent encoded sound. A common codec, G.711, has a sampling rate of 8 kHz (8000 samples per second), where each sample is represented by 8 bits. Therefore, the overall bit rate is 64 kbps. A packet is sent every 20 milliseconds, meaning that in each voice packet, the number of bits carrying representing the sound of the speaker's voice, called the payload, is 1280 bits, or 160 bytes. The overall bitrate can be considered the key metric for determining the amount of network capacity utilized by each codec, although this bitrate does not take into account the overhead bits required for any packet transmission, including header information like source and destination internet protocol (IP) addresses and so on.

Different codecs use different techniques to encode sound, and therefore can yield significantly different overall bitrates. A common type of codec utilizes "waveform coding" which tries to represent sound as accurately as possible, including background noise. Because of this governing philosophy, waveform codecs tend to have significantly higher overall bitrates than other codecs. G.711 is an example of such a codec. In G.711, a sample is taken at a rate of 8 kHz (one sample every 0.125 milliseconds), and each sample is represented by 8 bits. Sound is divided into several quantization levels, and each 8-bit sample is meant to represent one of these levels. This method of representing sound at different quantization levels form a subset of waveform coding codecs called "pulse code modulation." The method of determining those quantization levels can also take many forms, with the most common two called "μ-law compounding" and "A-law compounding." "G.711 with μ-law compounding" and "G.711 with A-law compounding" are both common codecs used in VoIP. Both have the same overall bitrate of 64 kbps.

Another common type of codec utilizes "vocoding," in which a human voice is synthesized by a "vocoder." G.729 is a codec that utilizes a vocoder. The vocoder uses a tone generator, a white noise generator, and a filter that is able to shape sound in much the same way as a human voice does. Therefore, rather than trying to represent whatever sound is being read in from the sound source regardless of origin, the vocoder instead processes sound to determine words being spoken by a person's voice from within the sound and attempts to recreate the those words. This allows for significantly lower overall bitrates than waveform coding, but comes at the cost of not representing the exact sound being read in from the sound source. Furthermore, a vocoder produces a "robotic voice" by default because it is no longer trying to reproduce the actual sound being read into the system but rather trying to recreate the words being spoken by the speaker.

An additional output is needed to allow the vocoder to not only reproduce the words being spoken by a speaker, but to make the words sound as if they are being spoken by the speaker. G.729 solves this issue by creating a code that compares the vocoder's "robotic voice" to that of the speaker, and transmits this code in every voice packet along. A receiver of a voice packet encoded using G.729 then has the code as well as the bits representing the vocoder function to the sound of words as if they are being spoken by the speaker. As a result of all of these steps, G.729 has an overall bitrate of 8 kbps, which is eight times lower than the overall bit rate for G.711. However, this comes at a significant cost to audio quality when compared to G.711. There are also several forms of the G.729 codec, including the original codec, "Annex A", "Annex B", and "Annex AB". "Annex A" has a slightly lower encoding complexity than the original algorithm. "Annex B" utilizes voice activity detection (VAD) to further reduce overall bitrate by representing the absence of voice in a much more compact way that requires a significantly lower bitrate than original G.729. "Annex AB" utilizes the concepts of both "Annex A" and "Annex B".

In the context of controlled-environment communication systems, G.729 may not be appropriate for biometric validation of inmates because of its significantly lower audio quality. However, in instances where network bandwidth may be scarce, G.711 may take up too much bandwidth. Therefore, it may be necessary to develop methods to determine when codecs should be renegotiated to adapt to different operating conditions.

SIP Signaling and the Session Description Protocol (SDP)

A brief discussion of SIP signaling and the Session Description Protocol (SDP) is provided focusing on the information necessary for detecting infractions in exemplary embodiments of the present invention. Users are identified by SIP-URIs, which bear a format similar to an email address, e.g. "SIP: 12095559999@voip-service-provider.net" or "SIP: Nathan.Frank@voip-service-provider.net." The SIP-URI may also be in the form of a telephone URI (tel-URI), which has the format "tel: +12095559999" for connecting to a user connected through a PSTN. In embodiments, these SIP-URIs can be used in addition to traditional phone numbers as part of allowed and block lists in JMS 230 to prevent inmates from contacting prohibited parties.

SIP signaling is composed of two broad message types called "requests" and "responses." During call setup, call disconnect, and established call phases, SIP requests and responses are sent between the two call parties to negotiate the parameters of a call session. The SIP requests contain messages for initiating certain behaviors between the end users, while SIP responses are messages that are sent in response to request messages. A SIP request sent from a user generally requires that a SIP response message be returned to that user containing info about the request handling. Some of the most common SIP request message types are the following:

TABLE 1

Common SIP Request Messages

| SIP Request | Use |
| --- | --- |
| INVITE | Used for the initial session setup request and negotiation of media and codec changes between the call endpoints |
| ACK | Confirms INVITE request |
| BYE | Initiates the end of a session |
| REGISTER | Communicates user location to proxy servers to assist in locating the user when a call is attempted |
| OPTIONS | Request from sender to ask receiver about its capabilities, including which methods it supports |

TABLE 1-continued

Common SIP Request Messages

| SIP Request | Use |
| --- | --- |
| REFER | Refers the recipient to begin transfer their call to another party (call transfer) |
| NOTIFY | Notifies the subscriber of a new event |

SIP response message types are signified by numeric labels 100-699 that generally refer to specific events at the receiver. The response numbers correspond to "reason phrases" that bear have no functional use but allow for human understanding. The ranges, divided into groups of 100, refer broadly to different types of responses:

1xx: Informational
2xx: Success
3xx: Redirection
4xx: Client error
5xx: Server error
6xx: Global failure Table 2 shows several of the most common SIP response messages, their reason phrases, and their common use:

TABLE 2

Common SIP Response Messages

| SIP Response | Reason Phrase | Use |
| --- | --- | --- |
| 100 | Trying | A proxy server is attempting to contact the called party |
| 180 | Ringing | The called party has been reached but has not yet accepted the call |
| 200 | OK | The request recipient accepts the request |
| 181 | Call is Being Forwarded | The called party has forwarded the call request to another party |
| 302 | Moved Temporarily | The called party SIP-URI has been temporarily changed |

Figure 4:
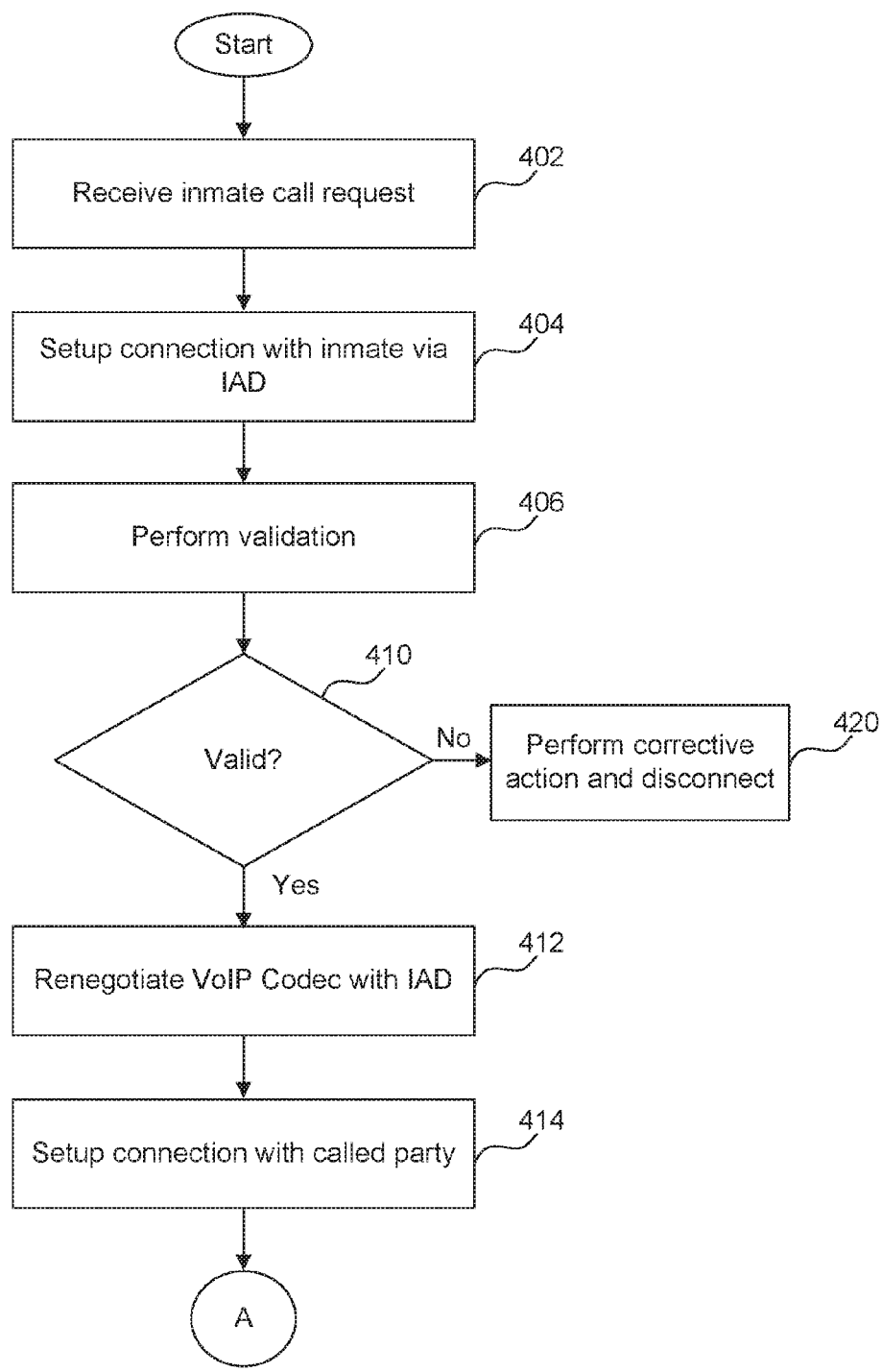
FIG. 4 illustrates an operational flowchart for codec renegotiation according to an embodiment.

The time of arrival of a SIP request or message relative to the call phase as shown in FIG. 4, and the content of those messages, are used in the M&D module 260 to detect suspected infractions. Both SIP requests and responses follow a similar format, as follows:

TABLE 3

High-level description of SIP message content

| Information Type | Use |
| --- | --- |
| Request Line (SIP Request only) | Request Type (e.g., INVITE), Request Universal Resource Identifier (URI), SIP protocol version |
| Status Line (SIP Response only) | SIP protocol version, Response Type (e.g., 200), Response Type Reason Phrase ("OK") |
| Headers | Information about the request/response and the message body |
| Empty Line | An empty line |
| Message Body | Session Description Protocol (SDP) information, Miscellaneous information |

The SIP request line is the first line of a SIP request message that contains the request type (e.g., the SIP message types from Table 1), a Request URI, and the SIP protocol version. A Request URI is simply a SIP-URI for the intended recipient of the message. When a SIP request message containing a URI such as "SIP: John.Smith@voip-service-provider.net." is sent by a user, a "SIP server" that serves the domain "voip-service-provider.net," also referred to as a "SIP proxy server" or just "proxy server," will try to locate user "John. Smith" and deliver the SIP request message to them.

The SIP status line is the first line of the SIP response message. Because SIP response messages are sent in response to SIP requests, the SIP status line contains less information, including the SIP protocol version, Response Type (an integer from 100-699) and the reason phrase as shown in Table 2.

The SIP header section contains fields with pertinent information to the session, such as the calling party, called party, and call session identifier numbers. Among the most commonly used fields are the following:

From: Contains a SIP-URI for the initiator of the session
To: Contains a SIP-URI for the initiator of the session
Call ID: contains the SIP-URI of the user sending the message
CSeq: Contains an integer to order request sequences
Contact: Contains a SIP-URI that can be used to directly contact the user
Refer-to: Contains a SIP-URI of a third party for call transfer
Referred-by: Contains a SIP-URI of the party that initiates call transfer The "from" and "to" fields contain SIP-URIs of the calling and called parties, respectively. The "Call ID" field contains a long identifier string that is used for all SIP request and response messages associated with a particular call session. The "CSeq" field will contain an integer and a SIP Request message type (e.g., INVITE, REFER). All messages with the same integer number in the field are messages that are associated with the original request. As an example, during a call setup, all messages associated with the call setup procedure will contain the same integer number in the "Cseq" field, and all SIP response messages will also contain "INVITE" in the field. In some embodiments this field can be used to determine the call phase of the call session, where all SIP messages associated with the call setup should have a "CSeq" with integer value of 1. The "contact" field contains a more specific SIP-URI for the user sending the message, which allows for direct contact with the user identified as opposed to the use of proxy servers to locate the user. Importantly, the information for the "contact" header field is only available after a called party is reached. Thus, SIP messages directed towards the calling party will not contain a "contact" header until the called party is found by a proxy server serving the called party's domain. Additionally, the "contact" header field may contain an additional string "isfocus" that signifies the potential that the user sending the message is attempting to initiate a conference-calling environment. "Refer-to" and "Referred-by" are headers that pertain to a call transfer attempt, where "Referred-by" contains the SIP-URI of the party that is initiating a call transfer, and "Refer-to" contains the third party that the call transfer is directed to.

The message body of a SIP message can contain additional pertinent information for the session, and typically includes at least a section of data following the Session Description Protocol (SDP) convention. SDP is a data format that specifies session level attributes as well as the encoding of data of any requested or active media streams. The SDP formats and messaging paradigm is described in greater detail below.

SDP Messaging

As described above, SDP messages may be contained in the body of SIP messages. More specifically, SDP messages are the primary method by which parties on a VoIP voice call can negotiate to determine a codec to be used between the two parties when transmitting VoIP packets. An SDP message will be sent within the body of a SIP message when a user wishes to negotiate or renegotiate the parameters of a session between two users on the voice call. In some cases, the desire of one of the parties on the call to renegotiate parameters will itself initiate a SIP message that contains the SDP message. In yet other cases, a VoIP GW that is serving the call between the two users may initiate the renegotiation, sending SIP messages to the parties on the call with the primary purpose of conveying SDP messages to the call parties to renegotiate the parameters of the call.

There are two types of SDP messages, an "SDP offer" and an "SDP answer." An SDP offer is sent by a requesting party that wishes to renegotiate the codec parameter. An SDP answer is then sent by an answering party that received the SDP offer, where the SDP answer indicates whether or not the answering party is willing to accept the codec parameters offered in the SDP offer message. Therefore, if a party on the call (or the VoIP GW 210 itself) wishes to initiate a renegotiation of a codec, a SIP message containing an SDP offer message with codec information will be sent to the other party.

The format of a typical SDP message is depicted in FIG. 8. Specifically, message 800 is an SDP offer message, while message 850 is an SDP answer message. In general, the formatting of the messages is similar, and the SDP message is understood to be an SDP offer or an SDP answer depending on the context in which it is being sent, where an SDP message being sent in response to an SDP offer received is assumed to be an SDP answer message, while an unsolicited SDP message is assumed to be an SDP offer message.

Each line of SDP offer message 800 and SDP answer message 850 begins with a "<type>=" line. Table 4 lists several of the information types, including all of those displayed in FIG. 8.

TABLE 4

High-level description of SDP information types

| Information Type | Definition |
| --- | --- |
| v = | SDP protocol version |
| o = | Creator of the SDP message and session identifier |
| s = | Session name |
| c = | connection information |
| t = | Time the session is active |
| m = | media name and transport address |
| a = | attributes |

Creator line 810 begins with "o=" to indicate that it is specifying several parameters related to the creator of SDP offer message 800. In an embodiment, creator line 810 specifies a username, session ID, session version, network type, address type, and address. The username in creator line 810, "Nate", is a username associated with the sender of SDP offer message 800. The session ID, "2090844916" in line 810, is a numeric string that forms a globally unique identifier for the session. The session version in creator line 810 is also "2090844916," and depends upon the implementation of the entity creating the SDP message. The network type in creator line 810 is the string "IN," which represents that the network type is an internet protocol address, while the address type in creator line 810 is "IP4", representing that the network type is an IPv4 address. Finally, the address is "192.168.209.1", which is a basic IPv4 address.

For the negotiation of codecs, the media name and attributes types, "m=" and "a=", are particularly pertinent to embodiments of the current disclosure. Fields beginning "m=" are "media lines" which specify a stream of media to be sent between the two users. Media line 820 shows the format of one such line. In general, users can have multiple streams between them, for example a media stream for audio and another stream for video such as in a video call. In such a case, there would exist two "m=" fields, one containing the string "m=audio" and another containing the string "m=video".

Media line 820 contains several parameters. First, it begins with the "m=" characters to indicate that it is a line that is specifying a media name and transport address. The first parameter is the media type, in this case "audio," specifying that the media being specified by the line is for audio. The next parameter is the port number, in this case "49170", specifying the transport protocol port number on which the packets of this media are to be received. The next parameter is the application, in this case "RTP/AVP," meaning that it is RTP, which utilizes a user datagram protocol (UDP). The "AVP" means that this is standard UDP with no encryption. Finally, the numbers "0," "8" and "18" are a list of the RTP payload types that are being offered. Lines with the attribute type, such as lines 822, 824, 826, and 828, specify the various configurations for each of the payload types "0," "8," and "18."

Each attribute line 822-828 specifies several parameters related to each RTP payload type "0", "8" and "18" specified in media line 820. Attribute lines 822, 824, and 826 follow the same format, while the attribute line 828 specifies a more specific configuration option related to RTP payload type "18." Lines 822-826 begin with "a=rtpmap:" characters, indicating that the sender wishes to use specific codecs to encode or "map" audio in the packet payload for that RTP payload type. The next character specifies the applicable RTP payload type. In this case, attribute line 822 applies to RTP payload type "0," attribute line 824 applies to the RTP payload type "8," and the attribute line 824 applies to the RTP payload type "18." Note that the possible RTP payload types specified in lines 822-826 are the same as those listed in media line 820.

The next parameter is the codec name, the clock rate, and optional parameters. In attribute line 822, the codec name is "PCMU," which represents the G.711 PCM encoding using the μ-law companding algorithm as described above, and the clock rate is "8000", meaning that voice is sampled at a rate of 8 kHz. Attribute line 822 contains no optional parameters. In attribute line 824, the codec name is "PCMA", which represents the G.711 PCM encoding using the A-law companding algorithm as described above, and the clock rate is again "8000," meaning that voice is sampled at a rate of 8 kHz. Thus, lines 822 and 824 represent the two standard forms of the G.711 codec scheme. Finally in attribute line 824 the codec name is "G729," which represents the G.729 codec as described above, and the clock rate is again "8000," representing a voice sampling rate of 8 kHz.

Attribute line 828 contains the string "a=fmtp:", which specifies that attribute line 828 represents parameters that are specific to a particular format. In this embodiment, the attribute line 828 specifies RTP payload type "18," meaning that line 828 specifies a feature related to the G.729 codec specified in attribute line 826. The following string, "annexb=yes", indicates that the version of the G.729 Annex B version of the codec is being used. As was described above, the Annex B version of G.729 allows for the use of voice activity detection (VAD) to represent silences, allowing a further saving of bandwidth over the voice channel.

To summarize, in SDP offer message 800, media line 820 and attribute lines 822, 824, 826, and 828 specify three potential codec configurations being "offered" by the party sending SDP offer message 800, where the three potential codec configurations are the G.711 PCM codec with μ-law companding algorithm (attribute line 822), the G.711 PCM codec with A-law companding algorithm (attribute line 824), and the Annex B version of the G.729 codec with VAD (attribute lines 826 and 828). SDP offer message 800 is sent from one call party to the other to initiate a negotiation of the codec between the two call parties.

SDP answer message 850 is sent as a response to SDP offer message 800. As can be seen by comparing SDP offer and answer messages 800 and 850, the formats are very similar in that they both contain lines beginning with an information type being specified, where each line of SDP answer message 850 is similar in format to an analogous line in SDP offer message 800. For example, creator line 860 in SDP answer message 850 contains the same number of parameters as creator line 810 of SDP offer message 800. The values of the parameters in creator line 860 are different than those of creator line 810, as should be expected because creator lines 810 and 860 specify parameters related to the respective creators of SDP offer messages 800 and 850 respectively. Thus, the username parameter of line 860 is "Nick" rather than "Nate" as in creator line 810, the address "192.168.209.2" of creator line 860 is different than that of "192.168.209.1" of creator line 810, and so on.

Of more importance are the differences between media line 822 and attribute lines 822-828 of SDP offer message 800 versus media line 862 and attribute line 864 of SDP answer message 850. This is because SDP answer message 850 is in response to the SDP offer message represented by SDP offer message 800, where SDP answer message 850 is meant to indicate a selection of one of the three codecs offered in SDP offer message 800. In this case, media line 862 contains several of the same parameters of media line 820, specifically the media name "audio", the port number "49170," and the application parameter "RTP/AVP". However, for the RTP payload type of media line 862, only one type is listed, "0", rather than the three RTP payload types listed in media line 820, "0", "8", and "18". Thus, SDP answer message 850 is an SDP answer message that has selected the RTP payload type "0" of the three RTP payload types offered in SDP offer message 800.

Attribute line 864 of SDP answer message 850 thus parrots the attribute line 822 of SDP offer message 800, indicating that the codec is agreed upon by the sender of SDP answer message 850. In this case, therefore, the codec negotiated between the sender of the SDP offer (SDP offer message 800) and the SDP answer (SDP answer message 850) is the G.711 PCM codec with the μ-law companding algorithm.

It should be noted that although this embodiment shows that attribute line 864 of the SDP answer message (SDP answer message 850) is identical to the corresponding attribute line 822 of SDP offer message 800, this need not always be the case. In embodiments, the party sending SDP answer message 850 may choose to only partially agree to the codec parameters stipulated by the SDP offer. A common example is in the negotiation of a type of G.729 codec being used. As seen in SDP offer message 800, attribute lines 826 and 828 represent an offer of the Annex B version of the G.729 codec, represented by the "annexb=yes" string of attribute line 828. However, the SDP answer message may choose to agree to the G.729 codec, but not the Annex B version of the codec. In such a case, the SDP answer message would contain an attribute line similar to that of attribute line 828, but with a string of "annexb=no" to represent that the party sending the SDP answer message agrees to use the G.729 codec, but not the Annex B version of the codec. In such a case, the codec selected will then be the original G.729 codec.

In summary, SDP messages 800 and 850 represent an SDP offer and SDP answer messages respectively. SDP offer message 800 offers the choice of three codecs to encode an audio stream, the G.711 PCM codec with μ-law companding algorithm (attribute line 822), the G.711 PCM codec with A-law companding algorithm (attribute line 824), and the Annex B version of the G.729 codec with VAD (attribute lines 826 and 828). The SDP answer message 850 answers the SDP offer message with a final selection from among the codecs offered in SDP offer message 800, settling on the G.711 PCM codec with μ-law companding algorithm, represented by media line 862 and attribute line 864. SDP messages 800 and 850 will themselves be carried in the body of two different SIP messages. This relationship will be described with greater detail below.

SDP Offer Messages with One Codec

In embodiments, call processing system 200 may wish to renegotiate the codec of an ongoing voice call to either a high voice quality codec such as G.711 or a bandwidth-optimized codec such as G.729 based on secondary considerations, such as changes in bandwidth utilization or determining that a voice call or inmate calling party is of a particular security concern. Call processing system 200, and more specifically signaling gateway 212 within the VoIP GW 210 within call processing system 200, may initiate a codec renegotiation with the inmate calling party and the outside call party by sending an SDP offer message similar to SDP message 800. However, it may be desirable to only offer a single codec so as to guarantee that the desired codec is selected by the party receiving the SDP offer message.

FIGS. 9A and 9B illustrate SDP messages in an interaction where only a single codec is offered during the SDP offer message. FIG. 9A illustrates SDP offer message 900 and an SDP answer message 920 where the codec being offered is the bandwidth-optimized codec G.729. SDP offer message 900 is similar to the SDP offer message 800 of FIG. 8. However, unlike SDP offer message 800, which offered a choice of three codecs through media line 820 and attribute lines 822-828, SDP offer message 900 offers only a single codec represented by media line 904 and attribute lines 906-908, where the codec being offered in this example is the G.729 Annex B variant. Thus, a recipient of the SDP offer message 900 may either choose to accept the codec indicate in media line 904 and attribute lines 906-908 or reject the negotiation entirely.

SDP answer message 920 may be sent by the recipient party of SDP offer message 900 to indicate that the party that receives the SDP offer message accepts the offered codec from SDP offer message 900. Similar to SDP answer message 850, media line 924 and attribute line 926 of SDP answer message 920 specify only one codec, in this case G.729. Therefore, SDP answer message 920 indicates that the offering of the G.729 codec in SDP offer message 900 has been accepted by the recipient party.

FIG. 9B illustrates an SDP offer message 940 and SDP answer message 960 where the only codec being offered is high sound quality codec G.711 with μ-law compounding. SDP offer message 940 is nearly identical to SDP offer message 900 of FIG. 9A, with the key difference being that media line 944 and attribute line 946 specifies "PCMU" (meaning the G.711 with μ-law compounding codec) as the codec rather than "G729" (meaning the G.729 codec). Likewise, SDP answer message 960 is nearly identical to SDP answer message 920 of FIG. 9A, with the key difference being that media line 964 and attribute line 966 specify "PCMU" (meaning the G.711 with μ-law compounding codec) as the codec rather than "G729" (meaning the G.729 codec).

In an embodiment, SDP offer message 900 may be sent by a call processing system, such as call processing system 200 of FIG. 2, and SDP answer message 920 may be sent by either IAD 106 serving the inmate calling party or a called party proxy server serving the outside called party. The call processing system generates SDP offer message 900, which offers only the choice of a single codec represented by media line 904 and attribute lines 906-908, to essentially force the usage of the codec to serve the voice packets on a voice call.

SIP Message Flow Call Setup and Disconnect

Figure 3:
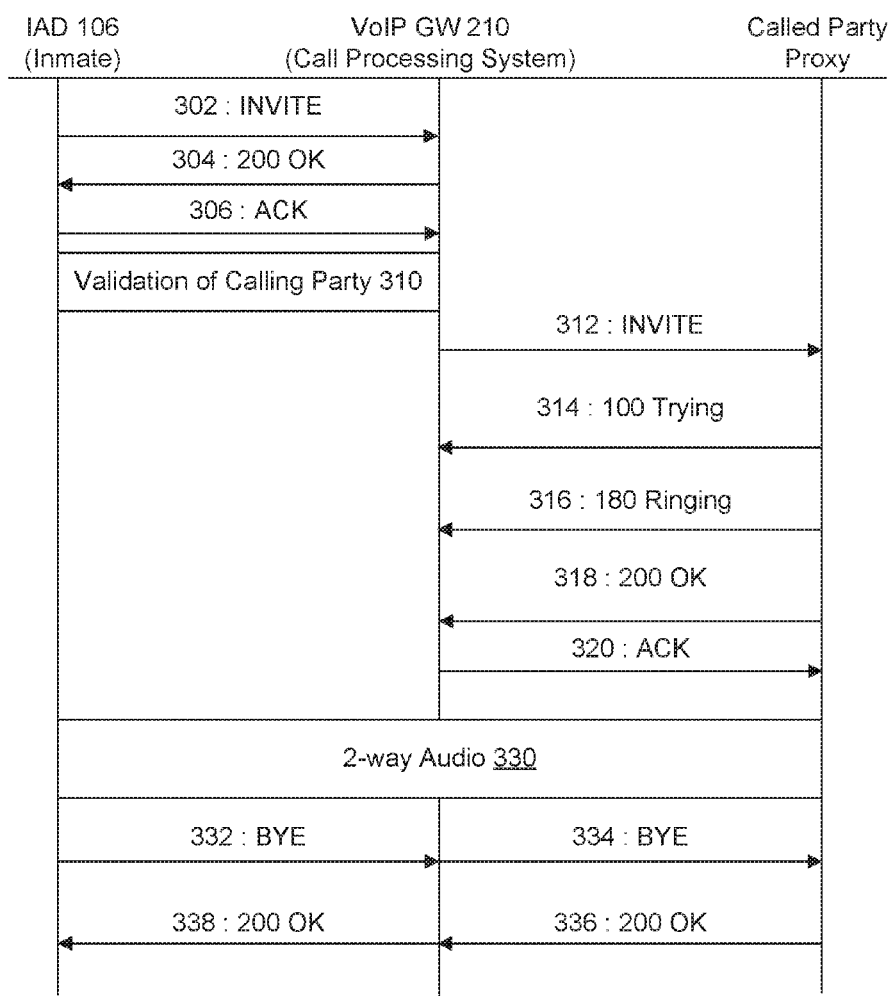
FIG. 3 illustrates a diagram of a signaling call flow to establish a VoIP voice call between an inmate and a called party, according to exemplary embodiments of the present disclosure.

FIG. 3 depicts call flow 300 of the SIP message flow for a call between an inmate in the prison facility and a called party outside of the prison facility according to exemplary embodiments of the present invention. The flow depicts the messages exchanged between three nodes, an IAD, a VoIP GW, and a called party proxy server. The IAD and the VoIP GW may be embodiments of IAD 106 and VoIP GW 210 as depicted in FIG. 1 and FIG. 2, while the called party proxy server represents a server that may serve the called party terminal. Generally, VoIP GW 210 in FIG. 3 also refers to a call processing system as a whole, such as call processing system 200, because call processing system 200 contains several elements that all communicate directly with VoIP GW 210 and can receive all of the VoIP signaling (voice data and control signaling) that VoIP GW 210 receives. Furthermore, in other embodiments, rather than IAD 106, VoIP GW 210 may communicate directly with terminals that are VoIP capable. For example, terminals 104a-n in FIG. 1, which are wireless terminals, may be VoIP capable and thus be able to process and produce SIP and SDP messages. Thus, in FIG. 3, "IAD" 106 recipient may also be the inmate calling party itself. The called party proxy server may be contained in WAN 184 depicted in FIG. 1. As shown in FIG. 2, the signal received by VoIP GW 210 from the inmate caller is a VoIP signal comprising VoIP and SIP signaling 202, where prior to the voice call being established, VoIP GW 210 only receives SIP signaling because no voice packets are yet being exchanged. In an embodiment, terminals 102a-n and 104a-n are VoIP-capable, and in another embodiment, translation has occurred in IAD 106 to convert analog voice to a VoIP signal. The signal received by VoIP GW 210 from the called party proxy server is also a VoIP signal, where either called party 190 is a VoIP-capable terminal 194, or is a legacy telephone terminal 190 that is converted into VoIP signal by a Media Gateway (MG) in WAN 184. Call flow 300 depicts the lifecycle of VoIP call from the call setup procedure through the call teardown procedure.

When an inmate attempts to establish a voice call, IAD 106 will send INVITE message 302 to VoIP GW. INVITE message 302 contains an SDP offer specifying an audio stream with an "m=audio" line and at least one codec with an attribute line beginning with "a=" as described previously. This SDP information represents the codec or codecs that IAD 106 wishes to use for encoding and decoding voice data within the voice packets that will be transmitted and received during the established voice call. INVITE message 302 also includes the "from", "to", "call id" and "cseq" headers as described previously.

Following the receipt of INVITE message 302 by VoIP GW 210, VoIP GW 210 may send back a 200 OK message 304 that indicates that a voice connection can be established between VoIP GW 210 and IAD 106 such that IAD 106 and VoIP GW 210 can begin exchanging voice packets. 200 OK message 304 contains an SDP answer including an "m=audio" line and an "a" line as described above. As described above, the SDP answer is sent in response to an SDP offer, and contains the choice of codec that the sender of the SDP answer decides to use from among the codecs listed in the SDP offer. Therefore, IAD 106 may offer several codecs listed in the SDP offer of INVITE message 302, and VoIP GW 210 responds to the SDP offer with an SDP answer contained in 200 OK message 304 with its selection from among the choices offered by IAD 106.

Following the receipt of 200 OK message 304, IAD 106 and VoIP GW 210 have agreed to establish a voice connection and negotiated which codec shall be used to represent the voice samples in the voice packets. IAD 106 follows its receipt of 200 OK message 304 with an ACK message 306. ACK message 306 typically does not contain an SDP portion of any kind, as the negotiation of the codec has already taken place. It should be noted here that both the SIP messages and voice packets being exchanged between VoIP GW 210 and IAD are also visible to other elements of the call processing system, as embodied by call processing system 200 depicted in FIG. 2. During the validation phase in particular, a validation server such as validation server 250 must receive the voice packets being sent from IAD 106 in order to perform validation functions.

Following the receipt of ACK message 306, IAD 106 and VoIP GW 210 may begin exchanging voice packets to perform validation phase 310 for the calling party, in this case the inmate. Note that no voice connection has yet been established between the inmate and the party the inmate is attempting to contact—only after validation has occurred indicating the propriety of the inmate's request will VoIP GW 210 begin sending messages to complete the connection between the inmate and the called party. However, in order to perform the validation, a voice connection must be established between the inmate and VoIP GW 210 via IAD 106, at which point VoIP GW 210 and IAD 106 may begin exchanging voice packets. As noted above, if the codec selected does not reproduce the sound of the speaker with a high enough quality, the validation functions based on voice biometrics may not function properly.

During validation phase 310, VoIP GW 210 and validation server may prompt the inmate for voice samples such as the inmate's name or some kind of pass phrase. In an embodiment, the inmate may first enter a PIN number that also indicates the inmate's identity, at which point the inmate may be prompted to speak his name into the terminal he is utilizing. After necessary voice samples are gathered from the inmate, the validation server may begin performing biometric analysis and comparison of the samples against known samples of the inmate's voice stored within the validation server, as described above, to ensure that the inmate speaking into the terminal presently has identified himself properly. In an embodiment, the validation server may also determine whether or not the intended called party is permitted to have contact with the inmate.

After validation is completed successfully, VoIP GW 210 may begin the process of contacting the intended call recipient. VoIP GW 210 sends an INVITE message 312 to the intended call recipient via the called party proxy server. As described above, the called party proxy server serves the call requests for the called party and may be contained within WAN 184. INVITE message 312 contains an SDP offer specifying an audio stream with an "m=audio" line and at least one codec with an "a" line as described previously. In an embodiment, the codecs offered in INVITE message 312 may be identical to those offered in the SDP offer of INVITE message 302. In another embodiment, the SDP offer of INVITE message 312 may only contain the codec that was agreed upon between VoIP GW 210 and IAD 106 in INVITE message 302 and 200 OK message 304, i.e. the codec that was used between IAD 106 and VoIP GW 210 during validation phase 310. INVITE message 302 also includes the "from", "to", "call id" and "cseq" headers as described previously.

Immediately following the receipt of the INVITE by the called party proxy server, 100 Trying message 314 is sent back to VoIP GW 210. The purpose of this message is simply to inform VoIP GW 210 that the message has been received by the called party proxy server, and that the called party proxy server is attempting to serve that request. 100 Trying message 314 does not come from the called party, and thus does not contain SDP information of any kind. Following 100 Trying message 314, the called party proxy server may also send a 180 Ringing signal 316 to VoIP GW 210. This signal is sent by the WAN after the called party is reached and the INVITE message delivered, and the called party has not yet accepted the call session, i.e. the called party has not yet picked up his or her phone. The "Ringing" label is representative of a phone ringing. In embodiments, the SIP 180 Ringing signal will typically parrot the header information received in the INVITE signal, but may not contain any SDP information. The message will also include the "contact" header giving the direct SIP-URI of the called party, as the called party has been reached at that point in the flow, and the called party can add its direct SIP-URI into any message.

200 OK message 318 is sent when the called party has accepted the call session. As with 200 OK message 304, in an embodiment 200 OK message 318 may contain the SDP answer message that corresponds to the SDP offer sent in INVITE message 312. As with 200 OK message 304, the SDP answer message contained in 200 OK message 318 contains the choice of codec that the sender of the SDP answer decides to use from among the codecs listed in the SDP offer of INVITE message 312. Therefore, VoIP GW 210 may offer several codecs listed in the SDP offer of INVITE message 312, and the called party proxy server responds to the SDP offer with an SDP answer contained in 200 OK message 318 with its selection from among the choices offered in the SDP offer of INVITE message 312.

In response to receiving the 200 OK, the called party proxy server then receives ACK message 320 from VoIP GW 210 that the 200 OK has been received by the inmate calling party. This message signifies the end of the call setup phase. At this point, a voice call is established between the inmate and the called party, where a 2-way audio stream 330 is established in which the inmate and called party exchange VoIP packets using RTP conveying voice data. The call established phase may see SIP INVITE messages related to changing media stream parameters, but no SIP signaling is required to maintain the call session at this point. In general, SIP messages seen during the call established phase may alert the system that suspected infractions is being initiated. Finally, when one of the two call parties wishes to end the call, BYE message 332 is sent by the user initiating the end of the call, and forwarded by VoIP GW 210 in BYE message 334. The other user responds with 200 OK message 336, at which point another 200 OK message 338 is forwarded by VoIP GW 210 to the party that initiated the end of the call. At this point the call is concluded.

As was described above, a typical call setup flow may either impede the use of biometric validation algorithms to properly validate an inmate party attempting to place a voice call, or take up too much network capacity to serve a voice call with high enough quality to use those biometric validation algorithms properly. Therefore, in embodiments, a methodology is provided by which an ICS, such as call processing system 200, can switch between negotiate codecs between the inmate and the called party based on the underlying security and network capacity concerns.

Renegotiating Codecs During a Voice Call Setup

FIG. 4 illustrates a flowchart for intelligent VoIP codec negotiation during a voice call setup served by an ICS, where the codec negotiation is based on security and network capacity concerns. FIG. 5, FIG. 8, and FIGS. 9A-B illustrate the technical details of SIP and SDP signaling messages to enable this, and will be discussed below. In an embodiment, the method depicted in FIG. 4 may be performed by an ICS such as call processing system 200 and the elements therein, as depicted in FIG. 2.

In FIG. 4, operational flowchart 400 illustrates a method for a VoIP GW, such as VoIP GW 210 depicted in FIG. 2, to perform intelligent VoIP codec negotiation during the setup of a voice call between an inmate caller and an outside call party prior to the voice call being established. In step 402, VoIP GW 210 receives a request from an inmate calling party to initiate a call attempt to an outside party. VoIP GW 210 receives the request in the form of a SIP INVITE message, such as INVITE message 302 depicted in FIG. 3, sent from IAD 106, such as IAD 106 depicted in FIG. 1. The SIP INVITE message is processed by a signaling gateway within VoIP GW 210, such as signaling gateway 212 depicted in FIG. 2. In an embodiment, IAD 106 may be configured to send an SDP offer message within the SIP INVITE message. IAD 106 may be configured so that the SDP offer message sent corresponding to the initial call request from an inmate always contains an offer for the G.711 PCM codecs (with either one or both of the μ-law and A-law algorithms) by including the proper SDP media and attribute lines, such as those embodied by attribute lines 720, 722 and 724 of FIG. 7.

In step 404, VoIP GW 210 can establish a voice call connection between itself and the inmate via IAD 106 by sending a 200 OK message, such as message 304 depicted in FIG. 3. VoIP GW 210 can be configured such that, for an initial call connection setup between itself and the inmate caller via IAD 106, the 200 OK message contains an SDP answer message, such as SDP message 750 depicted in FIG. 7. In an embodiment, the SIP and SDP messaging is generated by a signaling gateway within VoIP GW 210, such as signaling gateway 212 depicted in FIG. 2. The SDP answer message in step 704 may be further configured to accept the offer of the G.711 codec, as offered in the SDP offer message from step 702, by including the appropriate media and attribute line to accept the G.711 codec, as embodied by media line 760 and attribute line 762 depicted in FIG. 7.

Therefore, in an embodiment, in step 404 a voice connection is established between VoIP GW 210 and the inmate calling party via IAD 106 such that voice packets can be sent between IAD 106 and VoIP GW 210, and by configuring IAD 106 and VoIP GW 210 as described above, the codec used in those voice packets can be set to a high quality codec such as G.711 PCM codec such that validation efforts by VoIP GW 210 and the call processing center can be performed reliably. Thus, in step 406, biometric validation may be performed. This step may be performed by a validation server as embodied by validation server 250 depicted in FIG. 2.

As described above, in step 406 VoIP GW 210 in conjunction with the validation server may prompt the inmate may to speak his name into his phone terminal. After necessary voice samples are gathered from the inmate, the validation server may begin performing biometric analysis and comparison of the samples against known samples of the inmate's voice stored within the validation server, and speech characteristics such as the vibration rate of a speaker's vocal chords, resonant frequencies in their speech, and various other physiological characteristics are derived from the speech sample. These can be compared to those same characteristics extracted from a known sample of the inmate's voice stored in the validation server to ensure that the inmate speaking into the terminal presently has identified himself properly. Because the high sound quality G.711 codec is being used to encode voice data into voice packets exchanged between VoIP GW 210 and the inmate, validation algorithms based on biometric analyses may be more accurate.

If in step 410, the inmate call requests is determined not to be valid because of differences between the collected voice sample and the known sample, then corrective actions may be taken in step 420. These corrective actions may include making a note of the improper request in the inmate's record stored on a JMS, such as JMS 230 depicted in FIG. 2. In another embodiment, the call is rejected before attempting to establish a voice call between the inmate calling party and outside called party.

If, after performing the validation process in step 406, VoIP GW 210 and validation server determines that the inmate has identified himself properly and the call request is valid in step 410, then operational flowchart 400 can move on to step 412, where the codec can be renegotiated with between VoIP GW 210 and IAD 106. As was discussed above, high sound quality codecs such as G.711 produce strong sound quality for validation purposes, but also consume a significantly larger bandwidth than codecs optimized to consume less bandwidth such as G.729. In an embodiment, if network bandwidth is limited because of high call volumes from a correctional facility, then VoIP GW 210 can then initiate a codec renegotiation in step 412 to change the codec from a high sound quality codec to an bandwidth-optimized sound quality codec such as G.729.

This can be accomplished again using an SDP offer and SDP answer message, carried as the content in the body of SIP messages. In an embodiment, VoIP GW 210 sends another SIP INVITE message, sometimes referred to as a SIP re-INVITE, to IAD 106. VoIP GW 210 includes an SDP offer message in that SIP re-INVITE message to renegotiate the codec being used between VoIP GW 210 and IAD 106 when serving the voice packets of the inmate calling party. If VoIP GW 210 determines that the bandwidth availability is low for the call processing system due to high call volumes being served, VoIP GW 210 may generate an SDP offer message that offers only bandwidth-optimized codecs such as G.729, by including media and attribute lines that only specify those optimized codecs. Thus, when IAD 106 receives the SDP offer message embedded within the SIP INVITE message, IAD 106 accepts an optimized codec and send an SDP answer message to VoIP GW 210 with the appropriate media and attribute lines signifying that IAD 106 agrees to encode the inmate's voice packets using the optimized codec. This SDP answer message may be sent in the body of a SIP 200 OK message.

Finally, having renegotiated the codec between VoIP GW 210 and IAD 106, in step 414, VoIP GW 210 can then proceed to establish a connection with the called party so that the inmate calling party and the called party may communicate. This can be accomplished in the same way that the initial connection was established between IAD 106 and VoIP GW 210 in step 402. In an embodiment, VoIP GW 210 may send a SIP INVITE message to the called party proxy server. The SIP INVITE message may contain an SDP offer specifying the same codec that was established between VoIP GW 210 and IAD 106 in step 412, and once the called party accepts the call, the called party proxy server may send a 200 OK message containing an SDP answer message back to VoIP GW 210. As with the 200 OK messages in steps 412 and 404, the 200 OK message sent from the called party proxy server to VoIP GW 210 in step 414 may contain an SDP answer message indicating that the called party has accepted the codec offered in the SDP offer message.

Figure 5:
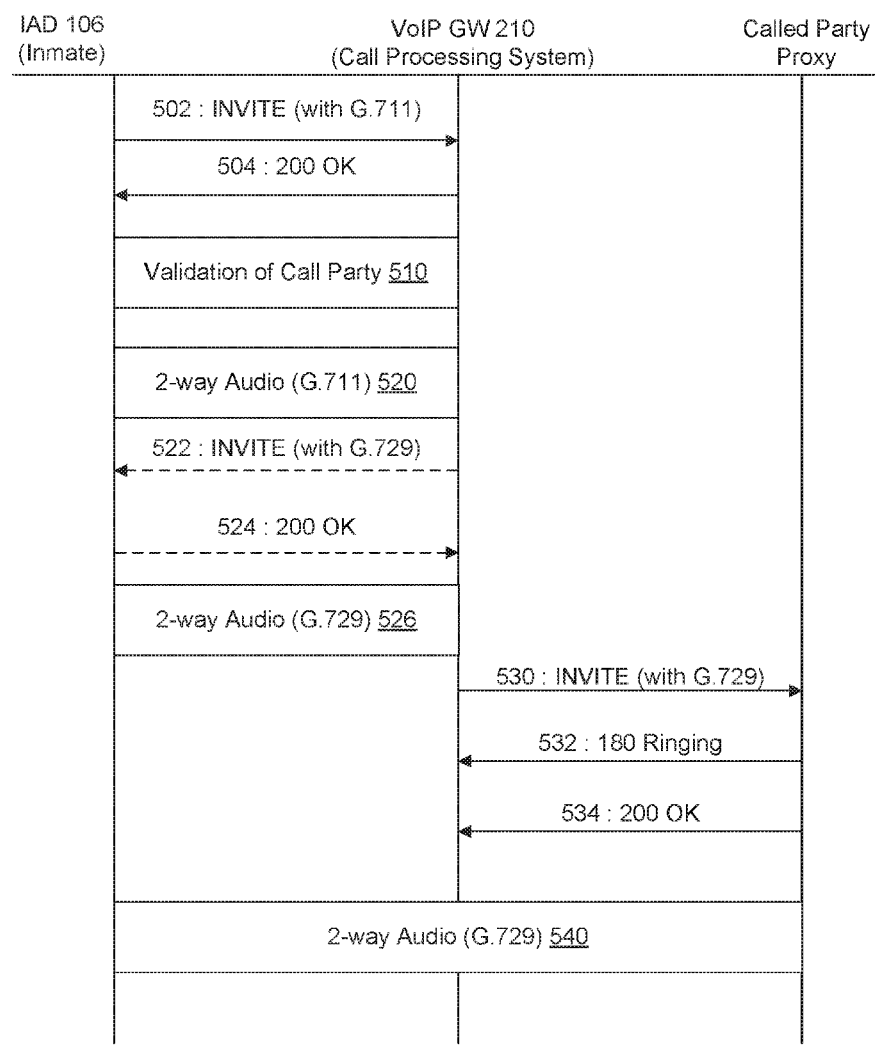
FIG. 5 illustrates a control signaling flow for codec renegotiation according to an embodiment.

FIG. 5 illustrates signaling flow 500 for a call setup procedure with intelligent codec renegotiation, according to an embodiment. Signaling flow 500 depicts the actual SIP messages that are exchanged between IAD 106, VoIP GW 210, and a called party proxy server during the method depicted in operational flowchart 400 of FIG. 4. Generally, VoIP GW 210 in FIG. 5 also refers to a call processing system, such as call processing system 200, as a whole, because the call processing system contains several elements that all communicate directly with VoIP GW 210 and can receive all of the VoIP signaling (voice data and control signaling) that VoIP GW 210 receives. Furthermore, in other embodiments, rather than IAD 106, VoIP GW 210 may communicate directly with terminals that are VoIP capable. For example, terminals 104a-n in FIG. 1, which are wireless terminals, may be VoIP capable and thus be able to process and produce SIP and SDP messages. Thus, in FIG. 5, the "IAD" recipient may also be the inmate calling party itself. Signaling flow 500 is described below with reference to the steps of operational flowchart 400. For clarity, FIG. 5 omits SIP messaging that is unimportant in understanding embodiments of the present disclosure.

Signaling flow 500 begins with a SIP INVITE message 502 being sent from IAD 106 to VoIP GW 210 within the call processing system. INVITE message 502 includes in its message body an SDP offer message that offers as one potential codec the G.711 PCMU for high sound quality. In an embodiment, the SDP offer message contained in INVITE message 502 may closely resemble SDP offer message 800 depicted in FIG. 8, where media line 820 and attribute lines 822-828 comprise an offering of three codec choices, with line 822 specifically offering the codec G.711 PCM with μ-law companding algorithm. INVITE message 502 may be an embodiment of step 402 in FIG. 4.

VoIP GW 210 of the call processing system then sends a 200 OK message 504 back to IAD 106. As was described previously, VoIP GW 210 includes a signaling gateway, such as signaling gateway 212 depicted in FIG. 2, that is responsible for the processing and generating of SIP and SDP messaging. 200 OK message 504 includes in its message body an SDP answer message. In an embodiment, the format of the SDP answer message included in 200 OK message 504 may closely resemble SDP answer message 850 depicted in FIG. 8. The SDP answer message will include one media line and one or more attribute lines, such as media line 862 and attribute line 864 of SDP answer message 850, that indicates the sender's choice of one codec from among those offered in the SDP offer message received in INVITE message 502. The sending of 200 OK message 504 corresponds to step 404 of operational flowchart 400, wherein the voice connection is setup between IAD 106 and the call processing system.

Importantly, VoIP GW 210 may choose any of the codecs offered in the SDP offer message of INVITE message 502, and may not choose a high sound quality codec due to other considerations. In an embodiment, during peak hours with high call volumes, VoIP GW 210 may simply forego the high sound quality codec and accept a validation process with lower accuracy in order to prevent call blocking and other congestion symptoms in their voice services. In such a case, the SDP answer message contained in 200 OK message 504 may indicate a bandwidth-optimized codec such as the G.729 codec rather than the G.711 μ-law codec.

Following the sending of the 200 OK message 504, a voice connection is then established on between IAD 106 and the call processing system such that biometric validation 510 of the inmate can be performed. Thus, voice packets are exchanged between IAD 106 and VoIP GW 210 where the voice data is encoded with a high sound quality codec, and the call processing center, and more specifically a validation server and VoIP GW 210 within the call processing center, can perform various biometric validation procedures to ensure the validity of the call request and the identity of the inmate making the request. As was discussed above, these validation procedures involve various speaker recognition in which speech characteristics such as the vibration rate of a speaker's vocal chords, resonant frequencies in their speech, and various other physiological characteristics are derived from the speech sample, and compared to the inmate's voice print sample. This step corresponds to steps 406 and 410 of operational flowchart 400 of FIG. 4.

Following biometric validation 510, 2-way audio stream 520 exchanging voice packets remains between IAD 106 and the call processing system. The voice packets traversing audio stream 520 are still encoded with the high sound quality codec. To initiate a renegotiation of the codec such that voice packets traversing audio stream 520 are encoded with a bandwidth-optimized codec, VoIP GW 210 in the call processing system, and more specifically, the signaling gateway within VoIP GW 210, sends SIP INVITE message 522 to IAD 106. As described above, INVITE message 522 is also sometimes called a re-INVITE" message because it only exists to renegotiate parameters of a voice call rather than initiate a voice call.

INVITE message 522 includes in its body a new SDP offer message that specifies a bandwidth-optimized codec such as G.729. In an embodiment, a bandwidth monitor in VoIP GW 210 such as bandwidth monitor 218 depicted in FIG. 2 may determine that the bandwidth utilization of the call processing system is higher than some threshold, and trigger VoIP GW 210 to generate an SDP offer message that only offers the bandwidth-optimized G.729 codec. Such a message can be seen in SDP offer message 900 of FIG. 9A. As can be seen in the message, media line 904 specifies only lists a single RTP payload type, "18," and the attribute lines 906-908 specify the parameters for that payload type. Attribute line 906 offers indicates that the RTP payload type "18" corresponds to the G.729 codec, as indicated by the presence of "G729" in attribute line 906. In another embodiment, the bandwidth monitor in VoIP GW 210 may determine that bandwidth utilization is low, and thus offer numerous options in the SDP offer. Such an SDP offer message may resemble SDP message 800 of FIG. 8, where, as described above, media line 820 and attribute lines 822-828 specify three different codecs, with attribute lines 822 and 824 in particular offering a high sound quality G.711 "PCM" codec.

In response, IAD 106 sends 200 OK message 524 in response. 200 OK message 524 includes in its body another SDP answer message, indicating its codec selection from among those offered in the SDP offer message contained in INVITE message 522. If the SDP offer message offered only a bandwidth-optimized codec, IAD 106 may accept the offer of this single codec. Such an SDP offer message may resemble SDP answer message 920 of FIG. 9A, where media line 924 and attribute line 926 indicate the acceptance of the G.729 codec, where that was the only codec offered in SDP offer message 900. Alternatively, if the SDP offer message of INVITE message 522 offered multiple codec choices including high sound quality codecs, the SDP answer message contained within 200 OK message 524 may resemble SDP answer message 850 of FIG. 8, where the codec accepted is the high sound quality G.711 "PCM" codec indicated in media line 862 and attribute line 864.

Therefore, after INVITE message 522 and 200 OK message 524 are exchanged between VoIP GW 210 and IAD 106 200, 2-way audio stream 526 may now exchange voice packets encoded with a bandwidth-optimized codec such as G.729. The exchange of INVITE message 522 and 200 OK message 524, and resulting 2-way audio stream 526, can be considered to be step 412 of operational flowchart 400 of FIG. 4.

Finally, a connection can be setup between the call processing system and the called party. This begins with the call processing system, and more specifically the signaling gateway of VoIP GW 210 contained within the call processing system, sending INVITE message 530 to the called party proxy server. In an embodiment, the INVITE message 530 includes in its body an SDP offer message. The SDP offer message may only contain a single offered codec matching the codec established between VoIP GW 210 and IAD 106 in audio stream 526, where such an SDP offer message may resemble SDP offer message 900 in FIG. 9A. Following the receiving of this message, the called party proxy server may send in response SIP 180 Ringing message 532, indicating that the terminal of the outside called party is ringing to notify the called party of an arriving voice call. SIP 180 Ringing message typically does not include an SDP message of any kind. In an embodiment, when VoIP GW 210 receives SIP 180 Ringing message, it may play a ringing sound over audio stream 526 to notify the inmate calling party that the outside called party is being contacted.

Finally, when the outside called party accepts the voice call, 200 OK message 534 may be sent from the called party proxy server to the call processing system. In an embodiment, 200 OK message 534 includes in its body an SDP answer message indicating its acceptance of the codec offered in the SDP offer message contained in INVITE message 530. The SDP answer message may resemble SDP answer message 920 of FIG. 9A.

In embodiments, VoIP GW 210 may also decide to send an SDP offer message in INVITE message 530 with multiple offered codecs, such as message 800 of FIG. 8, indicating that any of these codecs may be acceptable choices. There may be cases where this is warranted. In particular, for detecting attempts by the outside call party to perform fraudulent activity on behalf of the inmate calling party, it may be beneficial for the voice data generated by the outside called party and sent to VoIP GW 210 to be encoded with a high sound quality codec, while the packets sent from the inmate calling party via IAD 106 may only need to be of lower quality because of the numerous tight controls that the call processing system can exert over the inmate's communications. Therefore, in such embodiments, the codec of voice packets sent from the outside called party may be a different than the codec of voice packets sent from the inmate calling party. In such instances, a VoIP GW may perform a function called "transcoding" in which voice packets encoded with a first codec may be converted to voice packets of a second codec before being sent to the intended recipient. In the case of converting packets of a bandwidth-optimized codec to packets of a high sound quality codec, quality cannot be regained, but the voice packets will at least be decodable by the intended recipient of those voice packets.

After messages 530-534 are exchanged, a 2-way audio connection now exists between the inmate calling party and VoIP GW 210 via IAD 106 and the outside calling party and IAD 106. The VoIP gateway can then connect the two audio streams together into 2-way audio stream 540 wherein the inmate calling party and outside calling party can engage in a voice call. Therefore, messages 530-534 and the ensuing 2-way audio stream between the two call parties can be considered step 414 of FIG. 4.

Renegotiating Codecs During an Established Voice Call

Figure 6:
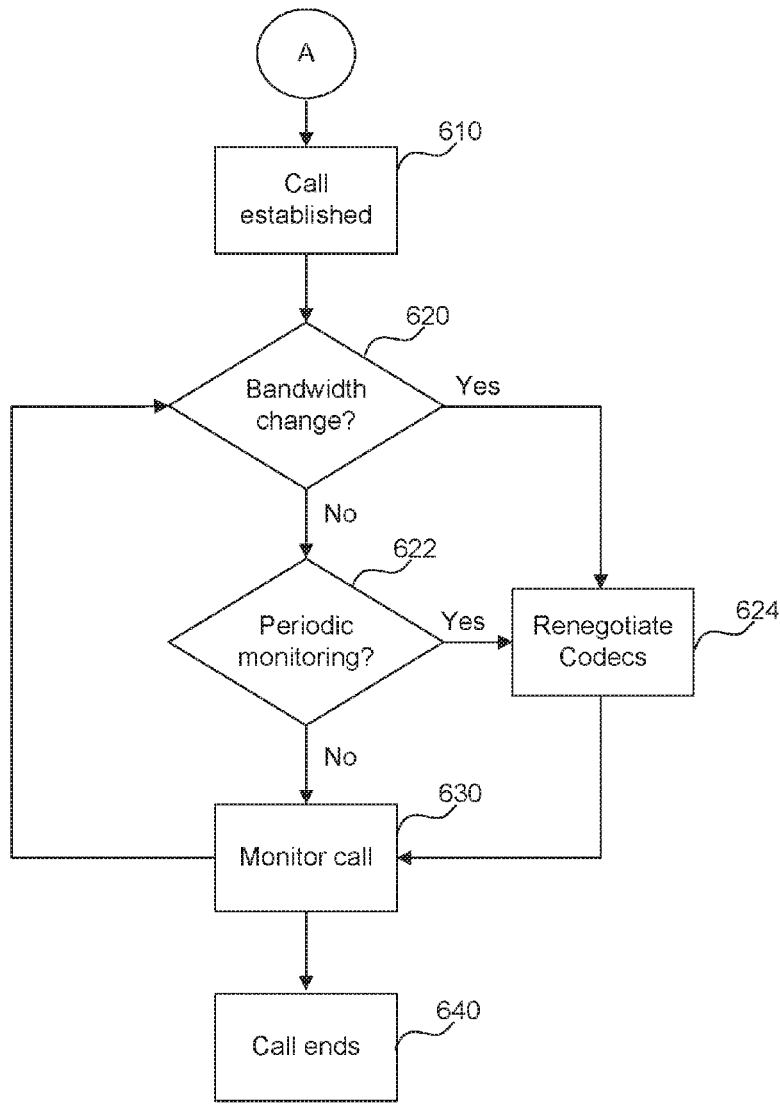
FIG. 6 illustrates an operational flowchart for codec renegotiation during an ongoing voice call according to an embodiment.

FIG. 6 illustrates operational flowchart 600 for intelligent VoIP codec negotiation by an ICS during an established voice call based on security and network capacity concerns. FIG. 7, FIG. 8, and FIGS. 9A-B illustrate the technical details of SIP and SDP signaling messages to enable this, and will be discussed below. In an embodiment, the method depicted in FIG. 6 may be performed by an ICS such as call processing system 200 and the elements therein, as depicted in FIG. 2.

A correctional facility may wish to perform ongoing monitoring of an inmate's voice call to detect potential fraudulent activity. In embodiments, the correctional facility may wish to perform biometric algorithms periodically or continuously on the voice call to determine if an inmate calling party or the outside called party is attempting a fraudulent activity. For example, as was discussed above, a common indicator of an attempt by an outside called party to add a third-party to the call is the occurrence of a hookflash signal which manifests as a clicking sound on a typical line. Such detection may occur in a monitoring and detection (M&D) module, such as M&D module 260 depicted in FIG. 2. Due to the way that many bandwidth-optimized codecs handle the encoding of sounds (and the absence of sound), these codecs may hinder the detection of hookflash" signals.

Additionally, there may be security instances where entire calls may be recorded for automated review sometime after the call has ended. For example, it may be desirable to perform biometric analyses such as keyword search, echo detection, and suspicious sound detection on an entire voice call. In such instances, it is desirable for the call to continuously or at least periodically utilize a high sound quality codec such as G.711. The voice call data, still formatted with the high quality codec, can then be stored in temporary files stored on a recording module within a call processing system, such as call recording module 270 depicted in FIG. 2. Because the files store voice call data encoded with a high sound quality codec, biometric analyses will produce a much more accurate in detecting potential security issues or concerns during that voice call that may be lost when lower quality codecs are employed. Biometric analyses could be performed on the temporary files, generating a metadata file noting any and all instances of keyword matches, echo or suspicious sound detections, and so on. After the analyses is complete, the temporary stored files could then be converted to significantly smaller files by reformatting the voice data into a bandwidth-optimized codec such as G.729 or TrueSpeech codec, and stored permanently in call recording module 270.

Therefore, correctional facility may desire that its call processing system renegotiate codecs intelligently between high sound quality codecs and bandwidth-optimized codecs based on security concerns subject to bandwidth availability.

In FIG. 6, operational flowchart 600 illustrates a method for the VoIP GW, such as VoIP GW 210 depicted in FIG. 2, to perform intelligent VoIP codec negotiation during an established voice call between an inmate caller and an outside call party. The call is established in step 610 based on the method related to operational flowchart 400 illustrated in FIG. 4. Following step 610, a voice call is established from the inmate calling party to the outside called party using a codec. In an embodiment this codec may be a codec optimized for minimal bandwidth consumption such as G.729. In another embodiment, this codec may be a high sound quality codec such as G.711 PCM.

In step 620, a bandwidth monitor, such as bandwidth monitor 218 depicted in FIG. 2, evaluates the bandwidth utilization of the calls being served by VoIP GW 210. If the bandwidth has changed significantly, this may trigger VoIP GW 210 to initiate a renegotiation of the codec in step 624. In an embodiment, bandwidth monitor 218 may detect that the bandwidth is severely utilized because it has reached some pre-set threshold of the total bandwidth provisioned to the call processing system. If a voice call between an inmate and an outside called party is using a high sound quality codec, the signaling gateway in a VoIP GW may generate SIP re-INVITE messages with embedded SDP offer messages to renegotiate the codec to a bandwidth-optimized codec such as G.729. VoIP GW 210 may then send these SIP re-INVITE messages to both an IAD, such as IAD 106, serving the inmate and the called party proxy server serving the outside called party to renegotiate the codec with both sides of the call. Once SDP answer messages are received from both IAD 106 and the called party proxy server, VoIP GW 210 can ensure that both sides are sending packets using the same bandwidth-optimized codec.

In another embodiment, bandwidth monitor 218 may detect that the bandwidth is under-utilized because it has reached below some pre-set threshold of the total bandwidth provisioned to the call processing system. If a voice call between an inmate and an outside called party is using a bandwidth-optimized codec such as G.729, the signaling gateway in a VoIP GW may generate SIP re-INVITE messages with embedded SDP offer messages to renegotiate the codec to a high sound quality codec such as G.711 PCM. In similar fashion, in step 624 VoIP GW 210 may then initiate the renegotiation by sending the SIP re-INVITEs to IAD 106 and called party proxy server.

In another embodiment, the call processing system may instead determine that, although there has not been a major shift in bandwidth utilization, resources exist to support a high sound quality codec for a particular voice call. Therefore, the signaling gateway in VoIP GW 210 and may generate SIP re-INVITE messages with embedded SDP offer messages to renegotiate the codec to a high sound quality codec such as G.711 PCM.

If no codec renegotiation is initiated by bandwidth considerations in step 620, then in step 622 the call processing system may then check to see whether or not there are any security measures that may warrant a codec renegotiation. In an embodiment, an inmate calling party engaged in a voice call may be considered a high security risk, and his call may be considered a good candidate for high sound quality recording to perform biometric analyses on the entire call. Such a voice call may have its codec renegotiated in step 624 to a high sound quality codec such as G.711 if it is not already using a high sound quality codec. In another embodiment, the call processing system may periodically initiate a codec renegotiation to a high sound quality codec to perform real-time biometric analyses on the call to detect for hookflash signals, extra voices on the call, and other anomalies as described above. In such embodiments, in step 624 the signaling gateway in VoIP GW 210 may generate and send SIP re-INVITE messages with embedded SDP offer messages to renegotiate the codec to a higher sound quality codec such as G.711 PCM. After some period of time, the call processing system may renegotiate the codec yet again to return to a bandwidth-optimized codec.

Regardless, in step 630 the call processing system monitors the call for various anomalies using biometric and sound detection analyses. This may occur regardless of the codec being utilized in the call, with appropriate shifts made in the monitoring policy depending on which codec is operative. In an embodiment, the call processing system may decide to use biometric analyses for monitoring only when a high sound quality codec is being utilized in the call. In another embodiment, the operative codec may be disregarded and all monitoring techniques and analyses utilized during the call. Finally, in step 640, the call is disconnected.

Figure 7:
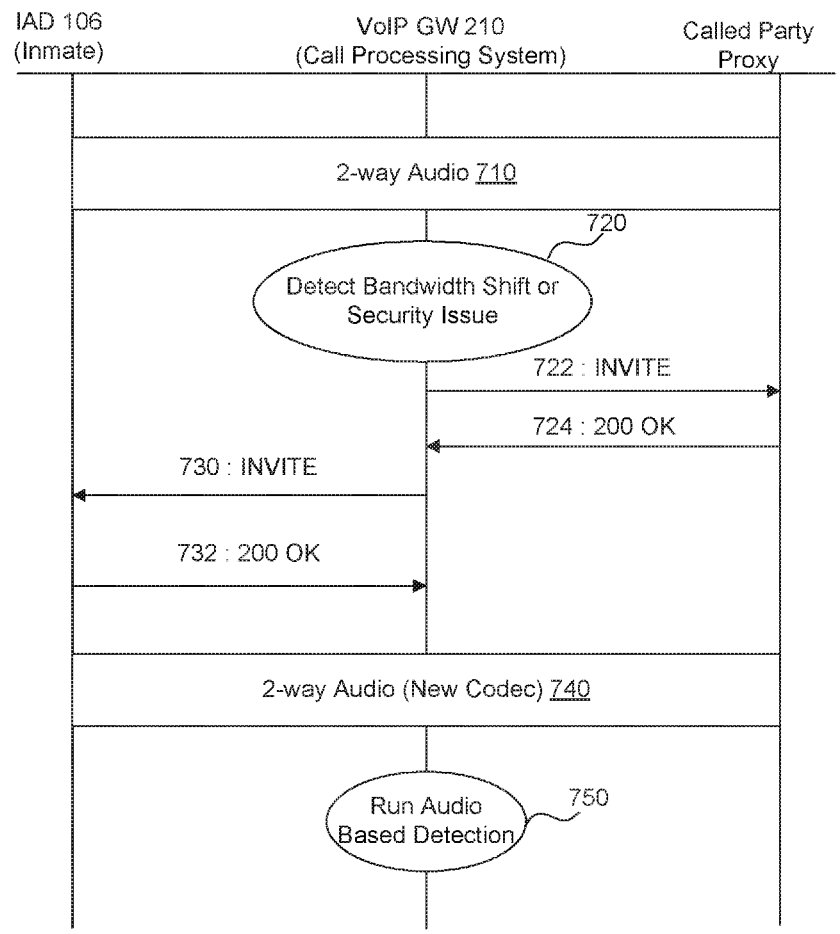
FIG. 7 illustrates a control signaling flow for codec renegotiation an ongoing voice call according to an embodiment.

FIG. 7 illustrates signaling flow 700 for intelligent codec renegotiation during an established voice call, according to an embodiment. Signaling flow 700 depicts the SIP messages that are exchanged between an IAD, such as IAD 106, a VoIP GW, such as VoIP GW 210, and a called party proxy server during the method depicted in operational flowchart 600 of FIG. 6. Generally, VoIP GW 210 in FIG. 7 also refers to the call processing system as a whole, such as call processing system 200, because the call processing system contains several elements that all communicate directly with VoIP GW 210 and can receive all of the VoIP signaling (voice data and control signaling) that VoIP GW 210 receives. Furthermore, in other embodiments, rather than IAD 106, VoIP GW 210 may communicate directly with terminals that are VoIP capable. For example, terminals 104*a-n* in FIG. 1, which are wireless terminals, may be VoIP capable and thus be able to process and produce SIP and SDP messages. Thus, in FIG. 3, the "IAD" recipient may also be the inmate calling party itself. Signaling flow 700 is described below with reference to the steps of operational flowchart 600. For clarity, FIG. 7 omits SIP messaging that is unimportant in understanding embodiments of the present disclosure.

Signaling flow 700 shows an initially established 2-way audio stream 710 where the voice data is encoded using some codec. While the voice call is ongoing, in step 720 the call processing system may regularly check the bandwidth usage via a bandwidth monitor such as bandwidth monitor 218. In an embodiment, if the bandwidth utilization reaches below a certain threshold, then the call processing system may determine that the bandwidth is underutilized and renegotiate the codec being used for a call using a bandwidth-optimized codec to use a high sound quality codec such as G.711 PCM with μ-law compounding. In another embodiment, if the bandwidth utilization reaches above a certain threshold, then the call processing system may determine that the bandwidth is over-utilized and renegotiate the codec being used for a call using a high sound quality codec to use a bandwidth-optimized codec such as G.729.

The thresholds may be expressed as a percentage of the total available bandwidth provisioned to the call processing center by a network provider, or an absolute bandwidth value in bits per second (bps).

During step 720 the call processing center may also check, in the absence of any significant shift in bandwidth usage, if a voice call for a particular inmate calling party should be subjected to extra scrutiny due to the because the inmate calling party or the outside called party is considered a particular security risk. If a voice call is selected based on that security criteria, and the voice call is utilizing a bandwidth-optimized codec, the call processing system may renegotiate the codec being used for the call to use a high sound quality codec such as G.711 PCM with μ-law compounding. Thus, step 720 corresponds to step 620 and 622 in operational flowchart 600 depicted in FIG. 6.

If the call processing system decides in step 720 to renegotiate the codec, then the call processing system, and more specifically a signaling gateway within VoIP GW 210 in the call processing system, may generate and send INVITE message 722 to the called party proxy server. As was discussed above, INVITE message 722 may also be referred to as a "re-INVITE" message. INVITE message 722 includes in its message body an SDP offer message that contains the desired codec. In an embodiment, a bandwidth monitor may determine that the bandwidth is over-utilized, and the call processing system may wish to renegotiate the codec to a bandwidth-optimized codec such as G.729. Thus, the call processing system may generate an SDP offer message embedded in INVITE message 722 that explicitly offers only a bandwidth-optimized codec. Thus, the SDP offer message embedded in INVITE message 722 may resemble SDP offer message 900 in FIG. 9A, where media line 904 and attribute lines 906-908 specify the G.729 codec as discussed above.

In another embodiment, a bandwidth monitor may determine that the bandwidth is underutilized, and the call processing system may wish to renegotiate the codec to a high sound quality codec such as G.711 with μ-law compounding. In such a case, the call processing system may generate an SDP offer message embedded in INVITE message 722 that explicitly offers only a high sound quality codec. The SDP offer message embedded in INVITE message 722 may resemble SDP offer message 940 in FIG. 9B, where the media line 944 and attribute line 946 specify only the G.711 codec with μ-law compounding as discussed above.

In response to INVITE message 722, the called party proxy server may send 200 OK message 724 that includes in its message body an SDP answer message that contains a response to the SDP offer message embedded in INVITE message 722. The SDP answer message embedded in 200 OK message 724 may resemble SDP answer message 920 in the case that the codec is being renegotiated to a bandwidth-optimized codec such as G.729, or SDP offer message 940 if the codec is being renegotiated to a high sound quality codec such as G.711 with μ-law compounding. Following the receipt of 200 OK message 724, the call processing system and the called party proxy server begin exchanging voice packets encoded with the renegotiated codec.

While the call processing system is renegotiating the codec with the outside called party via messages 722 and 724, the call processing system also renegotiates the codec with the inmate calling party via IAD 106. INVITE message 730 is sent to IAD 106 and includes in its body an SDP offer message. This SDP offer message will be nearly identical to the SDP offer message embedded in INVITE message 722 to the called party proxy server, with the only potential changes related to identification of the parties sending and receiving the SDP offer message. IAD 106 responds by sending 200 OK message 732 back to the call processing system, where 200 OK message 732 includes in its message body an SDP answer message. This SDP answer message is nearly identical to the SDP answer message embedded in 200 OK message 724, with the only potential changes related to identification of the parties sending and receiving the SDP answer message. Following the receipt of 200 OK message 732, the call processing system and IAD 106 also begin exchanging voice packets encoded with the renegotiated codec.

The exchange of INVITE message 722 and 200 OK message 724 with the called party proxy server, and INVITE message 730 and 200 OK message 732 with IAD 106, correspond to step 624 of operational flowchart 600. After these messages are transmitted and the codecs between IAD 106, VoIP GW 210, and the called party proxy server are renegotiated, a the call processing center can form new 2-way audio stream 740 between the inmate calling party and the outside called party where the voice packets exchanged are encoded with the renegotiated codec. This new audio channel can then be monitored in step 750 to perform biometric analyses as described above. Monitoring step 750 corresponds to step 640 of operational flowchart 600.

Call Recording

FIG. 10 illustrates a method for recording calls and performing non-real time biometric analysis on calls, according to an embodiment. FIG. 10 illustrates a flowchart 1000 for processing a recorded voice call sometime after the call has ended, and storing the call for long-term storage. In many instances, a controlled-environment call processing system may wish to record voice calls made between inmates and outside parties for security reasons. Although many voice calls are monitored in real-time, this may not be required for all voice calls because of inmates with lower security risk, or because of high processing load on the call processing center. In such cases, calls can be recorded and stored as data files, and these data files can be processed after the fact to perform various biometric analyses. In embodiments, the processing can determine if additional voices appeared on the call, if certain keywords were spoken, and if certain sounds were detected during the call indicating potential fraudulent activity, such as a hookflash indicating a three-way call attempt. Processing typically creates small metadata files which store information about any abnormal issues detected on the call.

As with call monitoring and biometric analysis before and during the voice call, the quality of a recorded voice call may also hinder biometric analysis. If a call uses a bandwidth-optimized codec such as G.729, then the recorded voice call data will have a similar quality and may create the same issues for monitoring and biometric analysis. Likewise, a high sound quality codec such as G.711 carries its own issues, because data files storing a higher sound quality codec will be significantly larger, and long-term storage of such calls would be impractical for many controlled-environment call processing systems.

Therefore, flowchart 1000 of FIG. 10 illustrates an embodiment for recording a voice call, performing biometric analysis on the stored call, and converting the voice call to a bandwidth-optimized codec to create a smaller data file that is appropriate for long-term storage. The steps of flowchart 1000 may be performed by a recording module, a monitoring and detection module, and a VoIP GW of a call processing system, such as call recording module 270, M&D module 260, and VoIP GW 210 of call processing center 200 depicted in FIG. 2. In step 1010, a call between an inmate calling party and outside called party is started, where VoIP GW 210 has negotiated a high sound quality codec to be utilized to serve the call. This negotiation may occur using the SDP messages of FIG. 8 and FIG. 9B as described above.

In step 1020, the voice packets received from either end of the call are stored by the call processing system using its recording module. In embodiments, the packets are stripped of all header information and only the payloads are stored such that the sound from either side of the line can be recreated exactly as it was when the call was still ongoing. As was described above, a high sound quality codec will result in a requisitely high sound quality recording which may be too large to be practical for long-term storage. In step 1030, the call ends.

In step 1040, the voice packet data stored in step 1020 may be processed by a monitoring and detection module to perform various biometric analyses. Because the data stored follows the data format dictated by the codec that was used during the call, these calls can essentially be played back as if they were occurring live, and the processes for monitoring the call could be performed in the same manner as if the calls were occurring live. Also, because the analyses of the call can be performed at times when the call processing system is idle (for example, well after midnight on any night of the week), more processing-intensive analyses can be performed such as speech recognition for determining all the words spoken on the call, as well as a keyword search for particular phrases that may signal security risks on the call. In embodiments, metadata files that store the results of the various analyses can be created and stored by the call recording module of the call processing center, allowing prison officials to access summarized data of any potential security risks during a call rather than having to listen to the entire call themselves.

In step 1050, the data stored in step 1020 can then be converted to a bandwidth-optimized codec format. In an embodiment, voice call data in the format of a G.711 codec can be converted to a G.729 format. Because G.711 requires an overall bitrate of 64 kbps and G.729 an overall bitrate of 8 kbps, the conversion can result in a file that is approximate eight times smaller than if the G.711 data was stored instead. After the conversion has occurred, a new data file storing the G.729 version of the voice call data can be stored by the recording module for long-term storage in step 1060, while the G.711 version of the voice call data can simply be discarded.

Computer System

It will be apparent to persons skilled in the relevant art(s) that various modules and features of the present disclosure, as described herein, can be implemented in hardware using analog and/or digital circuits, in software, through the execution of computer instructions by one or more general purpose or special-purpose processors, or as a combination of hardware and software.

Embodiments of the present disclosure can be implemented in hardware, or as a combination of software and hardware. Consequently, embodiments of the disclosure may be implemented in the environment of a computer system or other processing system. For example, call processing system 200 depicted in FIG. 2 and its associated operational flows depicted in FIGS. 4, 6 and 10 can be implemented in the environment of one or more computer systems or other processing systems. An example of such a computer system 1100 is shown in FIG. 11. One or more of the modules depicted in the previous figures, particularly the various modules of call processing system 200 depicted in FIG. 2, can be at least partially implemented on one or more distinct computer systems 1100.

FIG. 11 illustrates an exemplary embodiment of a computer system 1100 that can be used to implement the methods and apparatus of the present invention. Computer system 1100 includes one or more processors, such as processor 1104. Processor 1104 can be a special purpose or a general purpose digital signal processor. Processor 1104 is connected to a communication infrastructure 1106 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1100 also includes a main memory 1108, preferably random access memory (RAM), and may also include a secondary memory 1130. Secondary memory 1130 may include, for example, a hard disk drive 1112 and/or a removable storage drive 1114, representing a floppy disk drive, a magnetic tape drive, an optical disk drive, or the like. Removable storage drive 1114 reads from and/or writes to a removable storage unit 1118 in a well-known manner. Removable storage unit 1118 represents a floppy disk, magnetic tape, optical disk, or the like, which is read by and written to by removable storage drive 1114. As will be appreciated by persons skilled in the relevant art(s), removable storage unit 1118 includes a computer usable storage medium having stored therein computer software and/or data.

In alternative implementations, secondary memory 1130 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, a thumb drive and USB port, and other removable storage units 1122 and interface 1120 which allow software and data to be transferred from removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a PCMCIA slot and card, etc. Software and data transferred via communications interface 1124 are in the form of signals which may be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1118 and 1122 or a hard disk installed in hard disk drive 1112. These computer program products are means for providing software to computer system 1100.

Computer programs (also called computer control logic) are stored in main memory 1108 and/or secondary memory 1130. Computer programs may also be received via communications interface 1124. Such computer programs, when executed, enable the computer system 1100 to implement the present disclosure as discussed herein. In particular, the computer programs, when executed, enable processor 1104 to implement the processes of the present disclosure, such as any of the methods described herein. Accordingly, such computer programs represent controllers of the computer system 1100. Where the disclosure is implemented using software, the software may be stored in a computer program product and loaded into computer system 1100 using removable storage drive 1114, interface 1120, or communications interface 1124.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

What is claimed is:

1. A method for validating a call setup request being served by a controlled-environment call processing system utilizing voice over internet protocol (VoIP), comprising:
   receiving, from an interface device, the call setup request indicating that an inmate calling party being served by the interface device requests a voice call with a called party proxy server;
   creating a first voice connection with the interface device to serve the inmate calling party, wherein a first plurality of voice packets exchanged with the interface device is encoded using a first codec;
   in response to the creating, determining that the call setup request is valid via a first biometric validation analysis;
   in response to the determining that the call setup request is valid via the first biometric validation analysis, sending, to the interface device, an offer message to request using a second codec, in place of the first codec, to encode the first plurality of voice packets exchanged with the interface device;
   receiving, from the interface device, an answer message indicating that the interface device accepts the second codec;
   creating a second voice connection with the called party proxy server, wherein a second plurality of voice packets exchanged with the called party proxy server is encoded using the second codec; and
   establishing the voice call between the inmate calling party and the called party proxy server via the first voice connection and the second voice connection.

2. The method of claim 1, wherein the creating the first voice connection comprises:
   receiving, from the interface device, an initial offer message to request using one of a first plurality of codecs to encode the first plurality of voice packets received from the interface device, the first plurality of codecs including the first codec; and
   sending, to the interface device, an initial accept message indicating that the controlled-environment call processing system accepts the first codec, wherein the first plurality of voice packets exchanged with the interface device is encoded using the first codec.

3. The method of claim 1, wherein the first codec is a G.711 pulse code modulation (PCM) codec.

4. The method of claim 1, further comprising:
   in response to receiving the call setup request, determining that an available bandwidth is large to support the first codec; and
   in response to the determining, creating the first voice connection with the interface device to serve the inmate calling party, wherein the first plurality of voice packets exchanged with the interface device is encoded using the first codec.

5. The method of claim 1, wherein the creating the second voice connection with the called party proxy server comprises:
   sending, to the called party proxy server, a second offer message to request using the second codec to encode the second plurality of voice packets exchanged with the called party proxy server; and
   receiving, from the called party proxy server, a second answer message indicating that the called party proxy server accepts the second codec, wherein the second plurality of voice packets exchanged with the called party proxy server is encoded using the second codec.

6. The method of claim 1, wherein the second codec is a G.729 codec.

7. The method of claim 1, wherein the offer message utilizes a session description protocol (SDP) format, and wherein the offer message is embedded within a session initiation protocol (SIP) INVITE message.

8. The method of claim 7, wherein the answer message utilizes the SDP format, and wherein the offer message is embedded within a SIP 200 OK message.

9. The method of claim 1, wherein the first codec is a G.711 PCM codec, and the second codec is a G.729 codec, the method further comprising:
   determining, during the voice call, that an available bandwidth is above a threshold; and
   in response to the determining:
      sending, to the interface device, a second offer message to request using the first codec to encode the first plurality of voice packets exchanged with the interface device;
      sending, to the called party proxy server, a third offer message to request using the first codec to encode the second plurality of voice packets exchanged with the called party proxy server;
      receiving, from the interface device, a second accept message indicating that the interface device accepts the first codec, wherein the first plurality of voice packets exchanged with the interface device is encoded using the first codec; and
      receiving, from the called party proxy server, a third accept message indicating that the called party proxy server accepts the first codec, wherein the second plurality of voice packets exchanged with the called party proxy server is encoded using the first codec.

10. The method of claim 9, further comprising:
    in response to the receiving the third accept message, analyzing the first plurality of voice packets and the second plurality of voice packets to determine whether a fraudulent activity is occurring during the voice call, wherein the analyzing is performed via a second biometric analysis.

11. The method of claim 1, wherein the determining that the call setup request is valid comprises:
    receiving, from the interface device, an identifier of the inmate calling party and a voice sample gathered from a voice of the inmate calling party;

retrieving an existing voice sample based on the identifier; and determining that the voice sample matches the existing voice sample using a speaker recognition algorithm.

12. A system, comprising:
a memory;
a voice over internet protocol (VoIP) gateway, configured to:
receive, from an interface device, a call setup request indicating that an inmate calling party being served by the interface device requests a voice call with a called party proxy server;
create a first voice connection with the interface device to serve the inmate calling party, wherein a first plurality of voice packets exchanged with the interface device is encoded using a first codec;
in response to a validation server determining that the call setup request is valid via a first biometric validation analysis, send, to the interface device, an offer message to request using a second codec, in place of the first code, to encode the first plurality of voice packets exchanged with the interface device;
receive, from the interface device, an answer message indicating that the interface device accepts the second codec, wherein the first plurality of voice packets exchanged with the interface device is encoded using the second codec;
create a second voice connection with the called party proxy server, wherein a second plurality of voice packets exchanged with the called party proxy server is encoded using the second codec; and
establish the voice call between the inmate calling party and the called party proxy server via the first voice connection and the second voice connection; and
the validation server, configured to:
in response to the VoIP gateway creating the first voice connection, determine that the call setup request is valid via the first biometric validation analysis by the validation server.

13. The system of claim 12, wherein to create the first voice connection, the VoIP gateway is further configured to:
receive, from the interface device, an initial offer message to request using one of a first plurality of codecs to encode the first plurality of voice packets received from the interface device, the first plurality of codecs including the first codec; and
send, to the interface device, an initial accept message indicating that the VoIP gateway accepts the first codec, wherein the first plurality of voice packets exchanged with the interface device is encoded using the first codec.

14. The system of claim 12, wherein the first codec is a G.711 pulse code modulation (PCM) codec.

15. The system of claim 12, wherein the VoIP gateway is further configured to, in response to receiving the call setup request, determine that an available bandwidth is large to support the first codec,
wherein the VoIP gateway is further configured to, in response to the determining, create the first voice connection with the interface device to serve the inmate calling party, wherein the first plurality of voice packets exchanged with the interface device is encoded using the first codec.

16. The system of claim 12, wherein to create the second voice connection with the called party proxy server, the VoIP gateway is further configured to:

send, to the called party proxy server, a second offer message to request using the second codec to encode the second plurality of voice packets exchanged with the called party proxy server; and receive, from the called party proxy server, a second answer message indicating that the called party proxy server accepts the second codec, wherein the second plurality of voice packets exchanged with the called party proxy server is encoded using the second codec.

17. The system of claim 12, wherein the second codec is a G.729 codec.

18. The system of claim 12, wherein the offer message utilizes a session description protocol (SDP) format, and wherein the offer message is embedded within a session initiation protocol (SIP) INVITE message.

19. The system of claim 18, wherein the answer message utilizes the SDP format, and wherein the offer message is embedded within a SIP 200 OK message.

20. The system of claim 12, wherein the first codec is a G.711 PCM codec, and the second codec is a G.729 codec.

21. The system of claim 20, further comprising a monitoring and detection server, configured to, in response to receiving the answer message, analyzing the first plurality of voice packets and the second plurality of voice packets to determine whether a fraudulent activity is occurring during the voice call, wherein the analyzing is performed via a second biometric analysis.

22. The system of claim 12, wherein the memory is configured to store a plurality of voice samples, and to determine that the call setup request is valid, the validation server is further configured to:
receive, from the interface device, an identifier of the inmate calling party and a voice sample gathered from a voice of the inmate calling party;
retrieve an existing voice sample from within the plurality of voice samples based on the identifier; and
determine that the voice sample matches the existing voice sample using a speaker recognition algorithm.

23. A non-transitory computer program storage medium device tangibly embodying a program of instructions executable by at least one machine to perform a method for validating a call setup request being served by a controlled-environment call processing system utilizing voice over internet protocol (VoIP), the method comprising:
receiving, from an interface device, the call setup request indicating that an inmate calling party being served by the interface device requests a voice call with a called party proxy server;
creating a first voice connection with the interface device to serve the inmate calling party, wherein a first plurality of voice packets exchanged with the interface device is encoded using a first codec;
in response to the creating, determining that the call setup request is valid via a first biometric validation analysis;
in response to the determining that the call setup request is valid via the first biometric validation analysis, sending, to the interface device, an offer message to request using a second codec to encode the first plurality of voice packets exchanged with the interface device;
receiving, from the interface device, an answer message indicating that the interface device accepts the second codec;
creating a second voice connection with the called party proxy server, wherein a second plurality of voice packets exchanged with the called party proxy server is encoded using the second codec; and establishing the voice call between the inmate calling party and the called party proxy server via the first voice connection and the second voice connection.

24. The non-transitory computer storage medium of claim 23, wherein the creating the first voice connection comprises:
    receiving, from the interface device, an initial offer message to request using one of a first plurality of codecs to encode the first plurality of voice packets received from the interface device, the first plurality of codecs including the first codec; and
    sending, to the interface device, an initial accept message indicating that the controlled-environment call processing system accepts the first codec, wherein the first plurality of voice packets exchanged with the interface device is encoded using the first codec.

25. The non-transitory computer storage medium of claim 23, further comprising:
    in response to receiving the call setup request, determining that an available bandwidth is large to support the first codec; and
    in response to the determining, creating the first voice connection with the interface device to serve the inmate calling party, wherein the first plurality of voice packets exchanged with the interface device is encoded using the first codec.

26. The non-transitory computer storage medium of claim 23, wherein the creating the second voice connection with the called party proxy server comprises:
    sending, to the called party proxy server, a second offer message to request using the second codec to encode the second plurality of voice packets exchanged with the called party proxy server; and
    receiving, from the called party proxy server, a second answer message indicating that the called party proxy server accepts the second codec, wherein the second plurality of voice packets exchanged with the called party proxy server is encoded using the second codec.

27. The non-transitory computer storage medium of claim 26, wherein the answer message utilizes the SDP format, and wherein the offer message is embedded within a session initiation protocol (SIP) 200 OK message.

28. The non-transitory computer storage medium of claim 23, wherein the first codec is a G.711 PCM codec, and the second codec is a G.729 codec, further comprising:
    determining, during the voice call, that an available bandwidth is above a threshold; and in response to the determining:
    sending, to the interface device, a second offer message to request using the first codec to encode the first plurality of voice packets exchanged with the interface device;
    sending, to the called party proxy server, a third offer message to request using the first codec to encode the second plurality of voice packets exchanged with the called party proxy server;
    receiving, from the interface device, a second accept message indicating that the interface device accepts the first codec, wherein the first plurality of voice packets exchanged with the interface device is encoded using the first codec; and
    receiving, from the called party proxy server, a third accept message indicating that the called party proxy server accepts the first codec, wherein the second plurality of voice packets exchanged with the called party proxy server is encoded using the first codec.

29. The non-transitory computer storage medium of claim 28, further comprising, in response to the receiving the third accept message, analyzing the first plurality of voice packets and the second plurality of voice packets to determine whether a fraudulent activity is occurring during the voice call, wherein the analyzing is performed via a second biometric analysis.

30. The non-transitory computer storage medium of claim 23, wherein the determining that the call setup request is valid comprises:
    receiving, from the interface device, an identifier of the inmate calling party and a voice sample gathered from a voice of the inmate calling party;
    retrieving an existing voice sample based on the identifier; and
    determining that the voice sample matches the existing voice sample using a speaker recognition algorithm.

* * * * *